(12) United States Patent
Tulis et al.

(10) Patent No.: US 11,190,833 B2
(45) Date of Patent: Nov. 30, 2021

(54) SYSTEMS AND METHODS FOR RETRIEVING SEGMENTED MEDIA GUIDANCE DATA

(71) Applicant: Rovi Guides, Inc., San Jose, CA (US)

(72) Inventors: Corey Tulis, Portland, OR (US); David Wittke, Simi Valley, CA (US); Mikhail Aksenfeld, Castaic, CA (US); Michael McCarty, Agoura Hills, CA (US)

(73) Assignee: Rovi Guides, Inc., San Jose, CA (US)

( * ) Notice: Subject to any disclaimer, the term of this patent is extended or adjusted under 35 U.S.C. 154(b) by 34 days.

(21) Appl. No.: 16/461,685

(22) PCT Filed: Dec. 7, 2016

(86) PCT No.: PCT/US2016/065347
§ 371 (c)(1),
(2) Date: May 16, 2019

(87) PCT Pub. No.: WO2018/093401
PCT Pub. Date: May 24, 2018

(65) Prior Publication Data
US 2020/0045364 A1    Feb. 6, 2020

Related U.S. Application Data

(60) Provisional application No. 62/423,395, filed on Nov. 17, 2016.

(51) Int. Cl.
*H04N 21/433*    (2011.01)
*H04N 21/278*    (2011.01)
(Continued)

(52) U.S. Cl.
CPC ....... *H04N 21/4332* (2013.01); *H04N 21/278* (2013.01); *H04N 21/4314* (2013.01); *H04N 21/44209* (2013.01); *H04N 21/8456* (2013.01)

(58) Field of Classification Search
CPC ............. H04N 21/278; H04N 21/4314; H04N 21/4332; H04N 21/44209; H04N 21/8456
See application file for complete search history.

(56) References Cited

U.S. PATENT DOCUMENTS

| 5,630,119 A | 5/1997 | Aristides et al. |
| 2004/0002987 A1 | 1/2004 | Clancy et al. |

(Continued)

*Primary Examiner* — Nicholas T Corbo
(74) *Attorney, Agent, or Firm* — Haley Guiliano LLP

(57) ABSTRACT

Systems and methods are presented for reducing network traffic when retrieving media guidance data. For example, a media guidance application receives a first user selection to display a group of media asset identifiers (e.g., video-on-demand listings) and retrieves detailed information from a remote server relating to the media asset identifiers to display to a user. The media guidance application then may receive a user selection to display a second group of media asset identifiers (e.g., purchased media assets). If any of the media asset identifiers are common to both groups, then the media guidance application already obtained the detailed information and the detailed information does not need to be retransmitted in order to be displayed. Thus, the media guidance application only retrieves detailed information for media asset identifiers unique to the second group of media asset identifiers (e.g., they are only on the purchased media asset list).

14 Claims, 7 Drawing Sheets

(51) Int. Cl.
*H04N 21/431* (2011.01)
*H04N 21/442* (2011.01)
*H04N 21/845* (2011.01)

(56) References Cited

U.S. PATENT DOCUMENTS

2004/0187150 A1   9/2004   Gonder et al.
2006/0026635 A1*  2/2006   Potrebic ............. H04N 5/44582
                                                725/37
2013/0268973 A1* 10/2013   Archibong ............ G06Q 50/01
                                                725/51
2014/0129570 A1*  5/2014   Johnson ............. H04N 21/4126
                                                707/748

* cited by examiner

SYSTEMS AND METHODS FOR RETRIEVING SEGMENTED MEDIA GUIDANCE DATA

CROSS-REFERENCE TO RELATED APPLICATIONS

This application is a national stage application under 35 U.S.C. § 371 of International Application PCT/US2016/065347, filed Dec. 7, 2016, which claims the benefit of U.S. Provisional Patent Application No. 62/423,395 filed Nov. 17, 2016, which are hereby incorporated by reference in their entireties.

BACKGROUND

Given the plethora of media content available to modern television consumers, large data sets of media guidance data (i.e., data that informs users about media that can be consumed) often need to be transmitted to client devices (e.g., set-top boxes) from a content provider. The client device then may present the received media guidance data to a user so that the user can be informed of what media assets are available. In some instances, particularly at times during the day when many users watch television, there are a large number of sessions initiated by client devices with servers of the content provider in order to retrieve media guidance data. Due to the low-bandwidth nature of communication protocol between such systems, downloads of full sets of media guidance data took a significant amount of time. Prior systems dealt with this problem in part through automatic updates stored at the set-top box at low traffic times. However, many client devices may not be able to store detailed information for every media asset identifier that could be presented to a user due to memory constraints, and thus need to repeatedly transmit requests to the content provider for detailed information for particular media asset identifiers. This process may drive up network traffic and ultimately affect performance.

SUMMARY

Accordingly, systems and methods are disclosed herein for reducing network traffic when retrieving media guidance data. For example, a media guidance application (e.g., executed on a set-top box) receives a first user selection to display a group of media asset identifiers (e.g., video-on-demand listings) and retrieves detailed information from a server relating to the media asset identifiers to display to a user (e.g., from a remote server). The media guidance application then may receive a user selection to display a second group of media asset identifiers (e.g., purchased media assets). If any of the media asset identifiers are common to both groups, then the media guidance application already obtained the detailed information and the detailed information does not need to be retransmitted in order to be displayed. Thus, the media guidance application only retrieves detailed information for media asset identifiers unique to the second group of media asset identifiers (e.g., they are only on the purchased media asset list).

In some aspects, the media guidance application may receive a first user selection to navigate to a first group of media assets associated with a first plurality of media asset identifiers. For example, the media guidance application may receive a user selection (e.g., via a user input interface such as a remote control) to display a group of media asset identifiers. The group of media asset identifiers may be any set of related or unrelated media assets displayed to a user by the media guidance application. For example, the group of media asset identifiers may be a user-defined list (e.g., a favorites list), a purchases list, a video-on-demand catalog, a grid-guide showing a plurality of media assets from a plurality of sources, and any other criteria for grouping a plurality of media assets by the media guidance application.

The media guidance application may, in response to receiving the first user selection, retrieve, from a database containing media asset identifiers associated with groups of media assets, a first plurality of media asset identifiers corresponding to the first group of media assets. For example, the media guidance application may access a media guidance database containing media asset identifiers associated with groups of media assets stored locally in storage or remote at a media guidance data source accessible via a communication network. The media guidance application may query the media guidance database for a specific set of media asset identifiers associated with the first group of media assets (e.g., a video-on-demand screen). For example, the media guidance application may execute a program script utilizing a database query language such as SQL to determine whether an entry for the group of media assets is present in the media guidance database and to retrieve pointers to media asset identifiers stored in fields associated with the entry. The media guidance application may then retrieve the identifiers from memory based on the pointers.

The media guidance application may, in response to receiving the first user selection, store in a local storage device respective detailed information retrieved from a remote server for each of the first plurality of media asset identifiers. For example, the media guidance application may transmit a request or plurality of requests for detailed information for each of the media assets identifiers to the remote server (e.g., a media guidance data source via a communication network). As a specific example, the media guidance application may transmit a data packet to the remote server containing one or more identifiers and may receive the detailed information corresponding to the one or more identifiers. The media guidance application then stores the retrieved detailed information. In some embodiments, the media guidance application stores the retrieved detailed information in non-volatile memory (e.g., flash memory) if it is available. In other embodiments, the media guidance application stores the retrieved detailed information in volatile memory (e.g., SRAM).

The media guidance application may receive a second user selection to navigate to a second group of media assets associated with a second plurality of media asset identifiers. For example, the media guidance application may receive a user input (e.g., via a user input interface such as a touch screen) selecting a different group of media assets. For example, the media guidance application may first have received a request to view media assets identifiers in a video-on-demand guide and later receives a request to view media asset purchases. In some embodiments, the second plurality of media asset identifiers are stored in memory. For example, the media guidance application may be unable to store detailed information relating to media assets a user has purchased, but may be able to locally store (e.g., in non-volatile memory) identifiers of media assets the user has purchased. As the media guidance application retrieves detailed information during a session, some of the retrieved detailed information may pertain to the purchased media assets and thus would not need to be retrieved again, as described further below.

The media guidance application, in response to receiving the second user selection, determines whether the media asset identifiers overlap between the first and second groups and determines where to retrieve detailed information for the media asset identifiers of the second group based on whether the media asset identifiers overlap. The media guidance application may retrieve, from the database containing media asset identifiers associated with groups of media assets, a second plurality of media asset identifiers corresponding to the second group of media assets. For example, as discussed above with respect to retrieving the first plurality of media asset identifiers, the media guidance application may similarly retrieve the second group of media asset identifiers. For example, the media guidance application may access the media guidance database containing media asset identifiers associated with groups of media assets stored locally in storage or remote at a media guidance data source accessible via a communication network. The media guidance application may query the media guidance database for a specific set of media asset identifiers associated with the second group of media assets (e.g., a purchases screen) and retrieve the identifiers.

The media guidance application may compare a first respective entry in the database for each media asset identifier of the first plurality of media asset identifiers with a second respective entry in the database for each media asset identifier of the second plurality of media asset identifiers. For example, the media guidance application may execute a program script containing a for-loop to iteratively compare each media asset identifier in the first plurality of media asset identifiers and each media asset identifier in the second plurality of media asset identifiers. The media guidance application may retrieve data stored in entries associated with each media asset identifier of the first and second plurality of media asset identifiers to compare. For example, the media guidance application may retrieve from the database characters of media asset identifiers and/or metadata associated with the media asset identifiers to compare.

The media guidance application may determine a first subset of media asset identifiers, the first subset including each media asset identifier of the second plurality of media asset identifiers where data in the first respective entry matches data in the second respective entry. For example, the media guidance application may store an indication (e.g., on a list or other data structure) containing an identifier of each media asset identifier of the second plurality of media asset identifiers where a match between the first plurality of media asset identifiers and second plurality of media asset identifiers has been determined. Specifically, the media guidance application may determine a match based on comparing characters of two media asset identifiers (e.g., retrieved by the media guidance application from entries associated with the media asset identifiers in the database) and determining each character is identical and in the same order (e.g., based on indexing the characters). Upon determining a match, the media guidance application may execute an instruction to write an identifier of the matched media asset identifier to a list defining the first subset.

In some embodiments, the media guidance application may retrieve the detailed information of matched media asset identifiers (e.g., media asset identifiers determined to be in the first subset) in parallel with determining whether other media asset identifiers are in the first subset. For example, while continuing to loop through every entry corresponding to a media asset identifier of the first and second plurality of media asset identifiers and identify matches, each time a match is found the media guidance application may simultaneously retrieve the detailed information from local storage, as described further below. In this embodiment, the media guidance application may generate for display a partially complete display screen with detailed information for the second plurality of media asset identifiers that are part of the first subset while detailed information for other media asset identifiers is still being retrieved, which may quickly and efficiently provide detailed information to a user.

The media guidance application may determine a media asset identifier is part of the first subset in a variety of ways. In some embodiments, the media guidance application may retrieve, from the database, characters of a first media asset identifier of the first plurality of media asset identifiers in a first entry and characters of a second media asset identifier of the second plurality of media asset identifiers in a second entry. For example, the media guidance application may retrieve (e.g., by executing an SQL program script utilizing the "Select" command) a string of characters (e.g., "James Bond: Goldfinger") associated with a first media asset identifier of the first plurality of media asset identifiers (e.g., video-on-demand listings) and a string of characters (e.g., "James Bond: Casino Royale") associated with a second media asset identifier of the second plurality of media asset identifiers (e.g., recent purchases). The media guidance application then may compare the characters of the first media asset identifier with the characters of the second media asset identifier. For example, the media guidance application may compare indexed characters of the retrieved strings to determine whether each character matches. For example, the media guidance application may determine that the first ten characters (e.g., "James Bond:") match, but the subsequent characters do not (e.g., no indexed character of "Goldfinger" matches the corresponding indexed character of "Casino Royale").

The media guidance application may then determine whether the characters of the first media asset identifier match the characters of the second media asset identifier. For example, as described above, the media guidance application may determine whether each indexed character of the characters associated with the first media asset identifier matches a corresponding character of the characters associated with the second media asset identifier. The media guidance application may then, in response to determining the characters of the first media asset identifier match the characters of the second media asset identifier, determine the first media asset identifier corresponds to the second media asset identifier. For example, the media guidance application may determine that since all the characters match, the media asset identifiers match and thus the second media asset identifier is part of the first subset (e.g., detailed information is already stored locally).

In some embodiments, when determining whether a threshold number of characters match, the media guidance application may skip a series of characters that do not match if a latter series of characters do match. For example, the media guidance application would determine "Star Wars: First Episode" does not match the word "Episode" with a second string of characters "Star Wars: Episodes I" based on comparing solely the character indexes. However, by skipping the indices of "First" in the first string, the indices for "Episode" line up leading to the media guidance application determining a greater number of matched characters.

Alternatively or additionally, the media guidance application may, in response to determining that the characters of the first media asset identifier do not match the characters of the second media asset identifier, determine whether a threshold amount of the characters of the first media asset identifier match the characters of the second media asset identifier. For example, the media guidance application may determine a number or percentage (e.g., 80%) of characters that match between the characters of the first media asset identifier and the characters of the second media asset identifier. The media guidance application may then compare this to a threshold number or percentage of matched characters (e.g., 70%) and determine whether the amount or percentage of characters matched between the first media asset identifier and the second media asset identifier exceeds the threshold.

The media guidance application may, in response to determining that the threshold amount of the characters of the first media asset identifier match the characters of the second media asset identifier, retrieve metadata associated with the first media asset identifier and metadata associated with the second media asset identifier. For example, upon determining that the threshold amount or percentage of characters matched is exceeded by the characters of first and second media asset identifiers, the media guidance application may retrieve metadata associated with the first and second media asset identifiers. The metadata may be any data relating to the media asset identifier, including some or all of the associated detailed information. As an example, the first media asset identifier may be "Star Wars: Episode I" and the second media asset identifier may be "Star Wars: First Episode." Despite the differences between identifiers (e.g., based on character comparison as described above), the media guidance application may determine the two media asset identifiers match based on metadata (e.g., the actors and director) matching between the two identifiers since a threshold number of characters match.

The media guidance application may then compare the metadata associated with the first media asset identifier and the metadata associated with the second media asset identifier. For example, the media guidance application may compare a string of characters for the director associated with the first media asset identifier and the second media asset identifier (e.g., "George Lucas" and "George Miller") in the same manner as discussed above for comparing characters of the media asset identifiers. The media guidance application may then determine whether the metadata associated with the first media asset identifier corresponds to the metadata associated with the second media asset identifier. For example, the media guidance application may determine whether the metadata corresponds based on whether all, or a threshold number or percentage, of characters of the metadata associated with the first and second media asset identifier are matched. The media guidance application, in response to determining the metadata associated with the first media asset identifier matches the metadata associated with the second media asset identifier, determines the first media asset identifier corresponds to the second media asset identifier. For example, the media guidance application may determine that since a threshold amount of the characters match and that the metadata matches, the media asset identifiers match and thus the second media asset identifier is part of the first subset (e.g., detailed information is already stored locally). In some embodiments, if either the metadata or threshold amount of characters of the media asset identifiers match, but not both, the media guidance application may determine that the media asset identifiers are related and a subset of the detailed information between the two media asset identifiers corresponds and can be retrieved from local storage, but some detailed information may be retrieved from a remote server (e.g., if the media asset identifiers are different episodes of a series, the director and actors may be the same but the summary may be different).

Alternatively or additionally, the media guidance application may, in response to determining that the characters of the first media asset identifier do not match the characters of the second media asset identifier, access a data structure containing indications of whether media asset identifiers are associated. For example, the media guidance application may access a data structure containing equivalent identifiers which may be organized as a table where each entry (e.g., row) contains identifiers that are associated with the same media asset. The media guidance application may then retrieve an entry in the data structure for the first media asset identifier. For example, the media guidance application may execute an instruction (e.g., an SQL program script utilizing the "Select" command) to retrieve, from an entry for a first media asset identifier, all other associated media asset identifiers (e.g., from fields associated with the entry).

The media guidance application may then determine, based on data in the entry identifying the second media asset identifier, that the second media asset identifier is associated with the first media asset identifier. For example, the media guidance application may retrieve, from fields associated with an entry for the media asset identifier "Star Wars: Episode I," media asset identifiers "Star Wars: First Episode," and "Star Wars: Ep. 1" indicated as equivalent media asset identifiers. Based on comparing (e.g., by character comparison as described above) the second media asset identifier to the retrieved equivalent identifiers, the media guidance application can determine whether they are associated. The media guidance application may, in response to determining the first media asset identifier is associated with the second media asset identifier, determine a subset of the detailed information for the second media asset identifier that matches the first media asset identifier. As described further below, when two media asset identifiers are related or associated, but do not exactly match, some detailed information may be common to both identifiers and some may not. For example, the media guidance application may store a list of detailed information that is common between media asset identifiers determined to be related or associated, such as actors. The media guidance application may retrieve the subset of detailed information from local storage.

In some embodiments, the media guidance application may determine the detailed information for the second media asset identifier not retrieved from the local storage device. For example, as described above, the media guidance application may determine that a subset of detailed information (e.g., actor names) is common to both the first and second media asset identifiers. However, some detailed information (e.g., a summary) may not be common to both. In this situation, the media guidance application retrieves the detailed information for the second media asset identifier not retrieved from the local storage device from the remote server. The media guidance application thus can generate a full set of detailed information for the second media asset identifier for display without having to retrieve all of the information (which may cause delays/increase network traffic) from the remote server.

In some embodiments, the media guidance application may determine that a first media asset identifier of the first plurality of media asset identifiers is related, but not identical, to a second media asset identifier of the second plurality of media asset identifiers. For example, the media guidance application may determine, as described above, that the first and second media asset identifiers are not identical because of a difference in their characters. However, the media guidance application may determine that the two media asset identifiers are related or associated (e.g., based on a threshold number of characters matching, metadata corresponding, and/or a stored indication the two identifiers are related). For example, the first media asset identifier may be for "Star Wars: Episode II" and the second media asset identifier may be for "Star Wars: Episode III." While not identical, the media guidance application may determine that since the two media asset identifiers are related based on an indication that they are part of a series, some of the detailed information may be relevant. The media guidance application may then determine to retrieve a subset of the detailed information from the first media asset identifier to display with the second media asset identifier instead of transmitting a request to the remote server for the detailed information. As a specific example, the media guidance application may determine from a data structure that media asset identifiers that are part of a series often have the same actors, directors, and genres but not the same title or summary. Accordingly, the media guidance application may retrieve the actor, director and genre for "Star Wars: Episode II" and generate them for display with the identifier for "Star Wars: Episode III," thus saving a transaction with the remote server. In some embodiments, the media guidance application stores whether to request detailed information for related media assets as a user configurable option (e.g., via a button in a user interface) that can be toggled on or off.

The media guidance application may determine a second subset of media asset identifiers, the second subset including each media asset identifier of the second plurality of media asset identifiers where data in the first respective entry does not match data in the second respective entry. For example, the media guidance application may execute the program script described above for comparing media asset identifiers in the first and second plurality of media asset identifiers and sort any media asset identifiers unique to the second plurality of media asset identifiers into a list or other data structure (e.g., the second subset). For example, the media guidance application may, for each media asset identifier of the second plurality, retrieve data to compare from every media asset identifier of the first plurality. If none of the data compared (e.g., characters of the identifiers) match, then the media guidance application may execute an instruction to write an identifier of the media asset identifier for which none of the data matches to a list or other data structure defining the second subset (e.g., where detailed information has not already been retrieved from the remote server).

The media guidance application may then retrieve detailed information for each media asset identifier in the first subset of media asset identifiers from the local storage device. For example, the media guidance application has already retrieved the detailed information for each media asset identifier in the first subset from the remote server (e.g., media guidance data source). The media guidance application may store the detailed information in volatile memory (e.g., DRAM or SRAM) due to not having enough non-volatile memory available to store the detailed information permanently. Since the detailed information has already been retrieved for each media asset in the second subset, the media guidance application retrieves the detailed information from the corresponding blocks of memory where it is stored instead of transmitting a request for the detailed information to the remote server, minimizing transactions with the remote server and also maximizing the speed at which the second group of media asset identifiers can be loaded.

The media guidance application may then retrieve detailed information for each media asset identifier in the second subset of media asset identifiers from a remote server. For example, for media asset identifiers where the detailed information has not been received previously (i.e., each media asset identifier in the second subset), the media guidance application retrieves the detailed information from the remote server. For example, as described above for retrieving detailed information for the first plurality of media assets, the media guidance application transmits a data packet to a remote server containing each media asset identifier in the second subset. For example, the media guidance application may transmit the data packet including a single media asset identifier or a list or other suitable data structure of media asset identifiers. The media guidance application may then receive, from the remote server, the detailed information for each media asset identifier in the second subset.

In some embodiments, the media guidance application may determine that a third plurality of media asset identifiers are stored on the local storage device. For example, the media guidance application may have retrieved detailed information about a third group of media assets and may determine whether any detailed information retrieved for the third plurality of media asset identifiers overlaps with the second plurality of media asset identifiers. The media guidance application may then determine a third subset of media asset identifiers that are in both the second plurality of media asset identifiers and the third plurality of media asset identifiers. As described above when determining the first subset, the media guidance application may determine whether each media asset identifier of the second plurality of media asset identifiers matches one of the media asset identifiers of the third plurality and store an indication on a list or other data structure for each media asset identifier that matches. The media guidance application may then retrieve detailed information for each media asset identifier in the third subset of media asset identifiers from the local storage device. For example, as described above for the first subset, the media guidance application may retrieve detailed information from the local storage device since it has already been retrieved when the third plurality of media asset identifiers were previously displayed.

In some embodiments, the media guidance application retrieves a timestamp for detailed information for a first media asset identifier in the first subset stored on the local storage device. For example, the media guidance application may store a timestamp (e.g., the date and time) that detailed information for a media asset identifier was retrieved. The media guidance application may maintain a data structure with timestamps of when detailed descriptions were retrieved, or the timestamps may be stored with the detailed information (e.g., as a field in a table containing the detailed information). The media guidance application may determine, by subtracting the timestamp from the current time, whether the detailed information for the first media asset identifier exceeds a threshold amount of time stored. For example, the media guidance application may determine that the current time is 15:31 on May 31, 2016 (e.g., May 31, 2016) and the detailed information was retrieved at 10:31 on May 24, 2016. The media guidance application may determine the amount of time elapsed since retrieval of the detailed information by subtracting the individual values (e.g., 05 from 05, 24 from 31, etc.). As an example, the media guidance application may calculate that the time elapsed is five hours past one week (e.g., seven days and five hours). The media guidance application may then compare this value to a threshold value (e.g., five days) to determine whether the elapsed time exceeds the threshold time.

The media guidance application may then, in response to determining that the detailed information for the first media asset identifier exceeds the threshold amount of time stored, delete the detailed information for the first media asset identifier stored on the local storage device. For example, the media guidance application may delete the detailed information from the local storage device as opposed to retrieving it if the elapsed time is greater than the threshold time. The media guidance application may then retrieve new detailed information for the first media asset identifier from the remote server. For example, as described above, the media guidance application may transmit a request for detailed information relating to the media asset identifier to a remote server. The media guidance application may then receive detailed information associated with the media asset identifier (e.g., in a data packet) from the remote server. The media guidance application may then store the new detailed information for the first media identifier on the local storage device.

In some embodiments, the media guidance application may generate for display a plurality of options for types of detailed information to retrieve. For example, the media guidance application may generate a user interface including a plurality of options to customize what types of information is retrieved from a remote server. For example, the options may be for types of detailed information such as an option to not retrieve detailed information of type "actor," "director," "summary" or any other subset of the detailed information. The media guidance application may then receive a user input of a first option to not retrieve a first type of detailed information if it is not stored in the local storage device. For example, the media guidance application may receive a user input (e.g., via a user input interface) of an option to not retrieve detailed information for type "actor." The media guidance application may, in response to receiving the user input, store an indication in the local storage device to only retrieve the first type of detailed information if it is stored in the local storage device. For example, the media guidance application may store (e.g., in a data structure) an indication that unless "actor" information is stored locally, it is not to be retrieved (e.g., not retrieved from a remote server). In this way, the media guidance application allows the user to customize the information that is retrieved and stored and more efficiently manage storage on a storage device with limited capacity.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are disclosed herein for reducing network traffic when retrieving media guidance data. For example, a media guidance application (e.g., executed on a set-top box) receives a first user selection to display a group of media asset identifiers (e.g., video-on-demand listings) and retrieves detailed information from a server relating to the media asset identifiers to display to a user (e.g., from a remote server). The media guidance application then may receive a user selection to display a second group of media asset identifiers (e.g., purchased media assets). If any of the media asset identifiers are common to both groups, then the media guidance application already obtained the detailed information and the detailed information does not need to be retransmitted in order to be displayed. Thus, the media guidance application only retrieves detailed information for media asset identifiers unique to the second group of media asset identifiers (e.g., they are only on the purchased media asset list).

Figure 1:
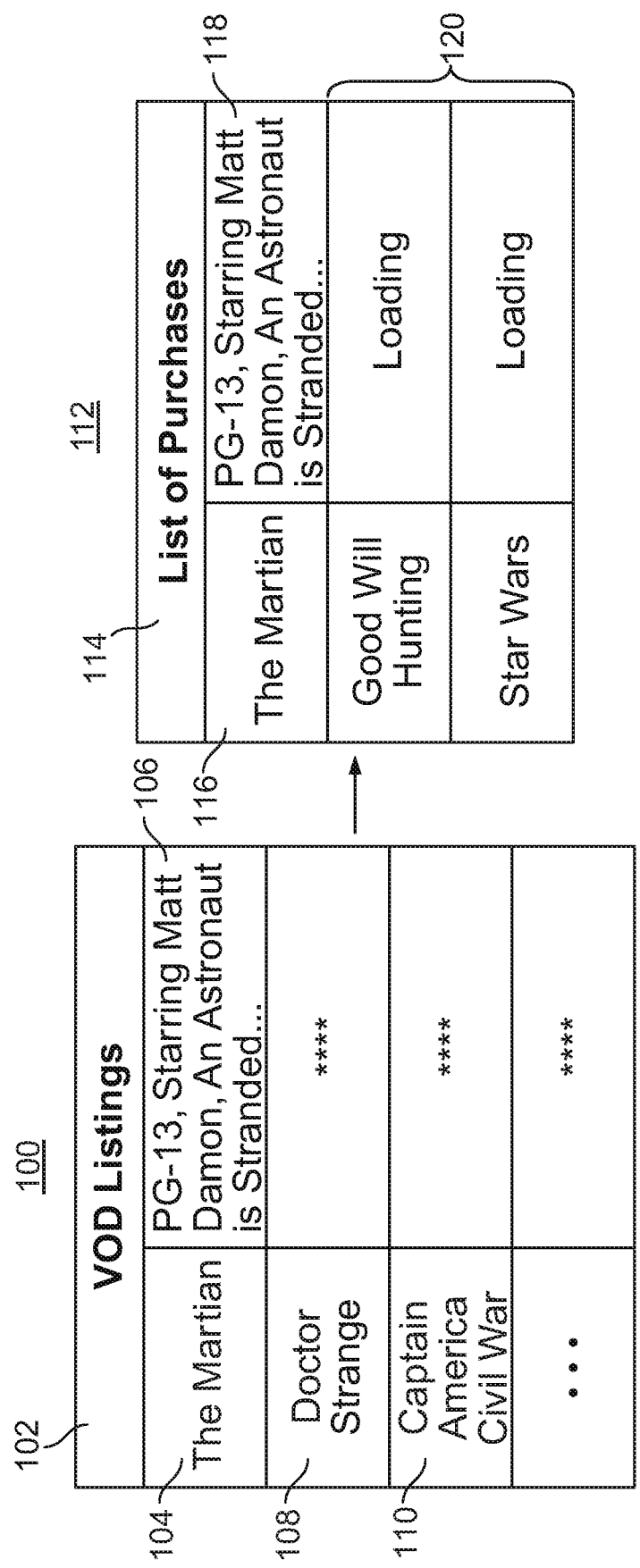
FIG. 1 shows an illustrative example of reducing network traffic when retrieving media guidance data, in accordance with some embodiments of the disclosure.

FIG. 1 shows an illustrative example of reducing network traffic when retrieving media guidance data, in accordance with some embodiments of the disclosure. For example, display 100 and display 112 may be presenting a media guidance application used by a user to navigate media asset identifiers (e.g., listings), as described further below with respect to FIGS. 2-3. Display 100 and display 112 may appear on one or more user devices (e.g., any of the devices listed in FIGS. 4-5 below). Moreover, the media guidance application may use the process described in FIG. 6 below to generate display 100 or display 112 or any of the features described therein.

Display 100 includes first group of media asset identifiers 102 (e.g., video-on-demand ("VOD") listings). For example, the media guidance application may retrieve from a media guidance data source a list of media asset identifiers (e.g., media asset identifiers 104, 108, and 110) which are available for a user to purchase. Each media asset identifier may have associated detailed information to help a user decide whether to purchase the media asset. For example, the media guidance application generates for display media asset identifier 104 with associated detailed information 106, which may be retrieved as described further below. As referred to herein, "detailed information" should be understood as any data that describes media assets. For example, the data may be any metadata related to the media asset identifier, such as a summary, title, content rating, and actors.

Display 112 includes second group of media asset identifiers 114 (e.g., a list of purchased media assets). The media guidance application may present display 112 after a user selection to leave first group of media asset identifiers 102 and navigate to second group of media asset identifiers 114. For example, as described further below, since the media guidance application already retrieved detailed information for media asset identifier 104 and media asset identifier 104 is identical to media asset identifier 116, the media guidance application retrieves detailed information 106 from memory (e.g., SRAM or DRAM) and generates it for display as detailed information 118. For media asset identifiers (e.g., media asset identifiers 120) where the detailed descriptions were not previously retrieved, the media guidance application retrieves the detailed descriptions from the remote server, as described further below.

The media guidance application may receive a first user selection to navigate to a first group of media assets associated with a first plurality of media asset identifiers. For example, the media guidance application may receive a user selection (e.g., via a user input interface such as a remote control) to display a group of media asset identifiers (e.g., first group of media asset identifiers 102). The group of media asset identifiers may be any set of related or unrelated media assets displayed to a user by the media guidance application. For example, the group of media asset identifiers may be a user defined list (e.g., a favorites list, a purchases list, a video-on-demand catalog, a grid-guide showing a plurality of media assets from a plurality of sources, and any other criteria for grouping a plurality of media assets by the media guidance application).

The media guidance application may, in response to receiving the first user selection, retrieve, from a database containing media asset identifiers associated with groups of media assets, a first plurality of media asset identifiers corresponding to the first group of media assets. For example, the media guidance application may access a media guidance database containing media asset identifiers associated with groups of media assets stored locally in storage or remote at a media guidance data source accessible via a communication network. The media guidance application may query the media guidance database for a specific set of media asset identifiers (e.g., media asset identifiers 104, 108, and 110) associated with the first group of media assets (e.g., first group of media asset identifiers 102). For example, the media guidance application may execute a program script utilizing a database query language such as SQL to determine whether an entry for the group of media assets (e.g., first group of media asset identifiers 102) is present in the media guidance database and to retrieve pointers to media asset identifiers (e.g., media asset identifiers 104, 108, and 110) stored in fields associated with the entry. The media guidance application may then retrieve the identifiers (e.g., media asset identifiers 104, 108, and 110) from memory based on the pointers.

The media guidance application may, in response to receiving the first user selection, store in a local storage device respective detailed information retrieved from a remote server for each of the first plurality of media asset identifiers. For example, the media guidance application may transmit a request or plurality of requests for detailed information (e.g., detailed information 106) for each of the media assets identifiers (e.g., media asset identifiers 104, 108, and 110) to the remote server (e.g., a media guidance data source via a communication network). As a specific example, the media guidance application may transmit a data packet to the remote server containing one or more identifiers (e.g., media asset identifiers 104, 108, and 110) and may receive the detailed information (e.g., detailed information 106) corresponding to the one or more identifiers. The media guidance application then stores the retrieved detailed information. In some embodiments, the media guidance application stores the retrieved detailed information in non-volatile memory (e.g., flash memory) if it is available. In other embodiments, the media guidance application stores the retrieved detailed information in volatile memory (e.g., SRAM).

The media guidance application may receive a second user selection to navigate to a second group of media assets associated with a second plurality of media asset identifiers. For example, the media guidance application may receive a user input (e.g., via a user input interface such as a touch screen) selecting a different group of media assets (e.g., second group of media asset identifiers 114). For example, the media guidance application may first have received a request to view media assets identifiers in a video-on-demand guide (e.g., first group of media asset identifiers 102) and later receives a request to view media asset purchases (e.g., second group of media asset identifiers 114). In some embodiments, the second plurality of media asset identifiers are stored in memory. For example, the media guidance application may be unable to store detailed information relating to media assets a user has purchased, but may be able to locally store (e.g., in non-volatile memory) identifiers (e.g., media asset identifier 116) of media assets the user has purchased (e.g., second group of media asset identifiers 114). As the media guidance application retrieves detailed information (e.g., detailed information 118) during a session, some of the retrieved detailed information may pertain to the purchased media assets and thus would not need to be retrieved again, as described further below.

The media guidance application, in response to receiving the second user selection, determines whether the media asset identifiers overlap between the first and second groups and determines where to retrieve detailed information for the media asset identifiers of the second group based on whether the media asset identifiers overlap. The media guidance application may retrieve, from the database containing media asset identifiers associated with groups of media assets, a second plurality of media asset identifiers corresponding to the second group of media assets. For example, as discussed above with respect to retrieving the first plurality of media asset identifiers, the media guidance application may similarly retrieve the second group of media asset identifiers (e.g., media asset identifiers 116 and 120). For example, the media guidance application may access the media guidance database containing media asset identifiers associated with groups of media assets stored locally in storage or remote at a media guidance data source accessible via a communication network. The media guidance application may query the media guidance database for a specific set of media asset identifiers associated with the second group of media assets (e.g., a purchases screen) and retrieve the identifiers (e.g., media asset identifiers 116 and 120).

The media guidance application may compare a first respective entry in the database for each media asset identifier of the first plurality of media asset identifiers with a second respective entry in the database for each media asset identifier of the second plurality of media asset identifiers. For example, the media guidance application may execute a program script containing a for-loop to iteratively compare each media asset identifier (e.g., media asset identifiers 104, 108, and 110) in the first plurality of media asset identifiers and each media asset identifier (e.g., media asset identifiers 116 and 120) in the second plurality of media asset identifiers. The media guidance application may retrieve data stored in entries associated with each media asset identifier of the first and second plurality of media asset identifiers to compare. For example, the media guidance application may retrieve from the database characters of media asset identifiers and/or metadata associated with the media asset identifiers to compare.

The media guidance application may determine a first subset of media asset identifiers, the first subset including each media asset identifier of the second plurality of media asset identifiers where data in the first respective entry matches data in the second respective entry. For example, the media guidance application may store an indication (e.g., on a list or other data structure) containing an identifier of each media asset identifier of the second plurality of media asset identifiers (e.g., media asset identifier 116) where a match between the first plurality of media asset identifiers and second plurality of media asset identifiers has been determined (e.g., an indication may be stored for media asset identifiers 116 and 104). Specifically, the media guidance application may determine a match based on comparing characters of two media asset identifiers (e.g., retrieved by the media guidance application from entries associated with the media asset identifiers in the database) and determining each character is identical and in the same order (e.g., based on indexing the characters). Upon determining a match, the media guidance application may execute an instruction to write an identifier of the matched media asset identifier (e.g., media asset identifier 116) to a list defining the first subset.

In some embodiments, the media guidance application may retrieve the detailed information of matched media asset identifiers (e.g., media asset identifiers determined to be in the first subset) in parallel with determining whether other media asset identifiers are in the first subset. For example, while continuing to loop through every entry corresponding to a media asset identifier of the first and second plurality of media asset identifiers (e.g., first group of media asset identifiers 102 and second group of media asset identifiers 114) and identify matches, each time a match is found (e.g., between media asset identifier 104 and 116) the media guidance application may simultaneously retrieve the detailed information (e.g., detailed information 106) from local storage, as described further below. In this embodiment, the media guidance application may generate for display a partially complete display screen with detailed information (e.g., detailed information 118) for the second plurality of media asset identifiers that are part of the first subset while detailed information for other media asset identifiers (e.g., media asset identifiers 120) is still being retrieved, which may more quickly and efficiently provide detailed information to a user.

The media guidance application may determine a media asset identifier is part of the first subset in a variety of ways. In some embodiments, the media guidance application may retrieve, from the database, characters of a first media asset identifier (e.g., media asset identifier 104) of the first plurality of media asset identifiers in a first entry and characters of a second media asset identifier (e.g., media asset identifier 116) of the second plurality of media asset identifiers in a second entry. For example, the media guidance application may retrieve (e.g., by executing a SQL program script utilizing the "Select" command) a string of characters (e.g., "The Martian") associated with a first media asset identifier (e.g., media asset identifier 104) of the first plurality of media asset identifiers (e.g., first group of media asset identifiers 102) and a string of characters (e.g., "The Martian") associated with a second media asset identifier (e.g., media asset identifier 116) of the second plurality of media asset identifiers (e.g., second group of media asset identifiers 114). The media guidance application then may compare the characters of the first media asset identifier with the characters of the second media asset identifier. For example, the media guidance application may compare indexed characters of the retrieved strings to determine whether each character matches. For example, the media guidance application may determine that every indexed character matches between the first and second media asset identifiers (e.g., media asset identifiers 104 and 116).

The media guidance application may then determine whether the characters of the first media asset identifier match the characters of the second media asset identifier. For example, as described above, the media guidance application may determine whether each indexed character of the characters associated with the first media asset identifier (e.g., media asset identifier 104) matches a corresponding character of the characters associated with the second media asset identifier (e.g., media asset identifier 116). The media guidance application may then, in response to determining the characters of the first media asset identifier match the characters of the second media asset identifier, determine the first media asset identifier corresponds to the second media asset identifier. For example, the media guidance application may determine that since all the characters match, the media asset identifiers match and thus the second media asset identifier is part of the first subset (e.g., detailed information is already stored locally).

In some embodiments, when determining whether a threshold number of characters match, the media guidance application may skip a series of characters that do not match if a latter series of characters do match. For example, the media guidance application would determine "Star Wars: First Episode" does not match the word "Episode" with a second string of characters "Star Wars: Episodes I" based on comparing solely the character indexes. However, by skipping the indices of "First" in the first string, the indices for "Episode" line up leading to the media guidance application determining a greater number of matched characters.

Alternatively or additionally, the media guidance application may, in response to determining that the characters of the first media asset identifier do not match the characters of the second media asset identifier, determine whether a threshold amount of the characters of the first media asset identifier match the characters of the second media asset identifier. For example, the media guidance application may determine a number or percentage (e.g., 80%) of characters that match between the characters of the first media asset identifier (e.g., one of media asset identifiers 104, 108, and 110) and the characters of the second media asset identifier (e.g., one of media asset identifiers 116 and 120). The media guidance application may then compare this to a threshold number or percentage of matched characters (e.g., 70%) and determine whether the amount or percentage of characters matched between the first media asset identifier and the second media asset identifier exceeds the threshold.

The media guidance application may, in response to determining that the threshold amount of the characters of the first media asset identifier match the characters of the second media asset identifier, retrieve metadata associated with the first media asset identifier and metadata associated with the second media asset identifier. For example, upon determining that the threshold amount or percentage of characters matched is exceeded by the characters of first (e.g., one of media asset identifiers 104, 108, and 110) and second media asset identifiers (e.g., one of media asset identifiers 116 and 120), the media guidance application may retrieve metadata associated with the first and second media asset identifiers. The metadata may be any data relating to the media asset identifiers, including some or all of the associated detailed information (e.g., detailed information 106). As an example, the first media asset identifier may be "Star Wars: Episode I" and the second media asset identifier may be "Star Wars: First Episode." Despite the differences between identifiers (e.g., based on character comparison as described above), the media guidance application may determine the two media asset identifiers match based on metadata (e.g., the actors and director) matching between the two identifiers since a threshold number of characters match.

The media guidance application may then compare the metadata associated with the first media asset identifier and the metadata associated with the second media asset identifier. For example, the media guidance application may compare a string of characters for the director associated with the first media asset identifier (e.g., one of media asset identifiers 104, 108, and 110) and the second media asset identifier (e.g., one of media asset identifiers 116 and 120) in the same manner as discussed above for comparing characters of the media asset identifiers. The media guidance application may then determine whether the metadata associated with the first media asset identifier corresponds to the metadata associated with the second media asset identifier. For example, the media guidance application may determine whether the metadata corresponds based on whether all, or a threshold number or percentage, of characters of the metadata associated with the first (e.g., one of media asset identifiers 104, 108, and 110) and second media asset identifier (e.g., one of media asset identifiers 116 and 120) are matched. The media guidance application, in response to determining the metadata associated with the first media asset identifier matches the metadata associated with the second media asset identifier, determines the first media asset identifier corresponds to the second media asset identifier. For example, the media guidance application may determine that since a threshold amount of the characters match and that the metadata matches, the media asset identifiers match (e.g., one of media asset identifiers 104, 108, and 110 matches with one of media asset identifiers 116 and 120) and thus the second media asset identifier is part of the first subset (e.g., detailed information is already stored locally).

In some embodiments, if either the metadata or threshold amount of characters of the media asset identifiers match, but not both, the media guidance application may determine that the media asset identifiers are related and a subset of the detailed information between the two media asset identifiers corresponds and can be retrieved from local storage, but some detailed information may be retrieved from a remote server (e.g., if the media asset identifiers are different episodes of a series, the director and actors may be the same but the summary may be different).

Alternatively or additionally, the media guidance application may, in response to determining that the characters of the first media asset identifier do not match the characters of the second media asset identifier, access a data structure containing indications of whether media asset identifiers are associated. For example, the media guidance application may access a data structure containing equivalent identifiers which may be organized as a table where each entry (e.g., row) contains identifiers that are associated with the same media asset. The media guidance application may then retrieve an entry in the data structure for the first media asset identifier (e.g., one of media asset identifiers 104, 108, and 110). For example, the media guidance application may execute an instruction (e.g., an SQL program script utilizing the "Select" command) to retrieve, from an entry for a first media asset identifier, all other associated media asset identifiers (e.g., from fields associated with the entry).

The media guidance application may then determine, based on data in the entry identifying the second media asset identifier, that the second media asset identifier is associated with the first media asset identifier. For example, the media guidance application may retrieve, from fields associated with an entry for the media asset identifier "Star Wars: Episode I," media asset identifiers "Star Wars: First Episode," and "Star Wars: Ep. 1" indicated as equivalent media asset identifiers. Based on comparing (e.g., by character comparison as described above) the second media asset identifier (e.g., one of media asset identifiers 116 and 120) to the retrieved equivalent identifiers, the media guidance application can determine whether they are associated. The media guidance application may, in response to determining the first media asset identifier is associated with the second media asset identifier, determine a subset of the detailed information (e.g., detailed information 118) for the second media asset identifier that matches the first media asset identifier. As described further below, when two media asset identifiers are related or associated, but do not exactly match, some detailed information may be common to both identifiers and some may not. For example, the media guidance application may store a list of detailed information that is common between media asset identifiers determined to be related or associated, such as actors. The media guidance application may retrieve the subset of detailed information from local storage.

In some embodiments, the media guidance application may determine the detailed information for the second media asset identifier not retrieved from the local storage device. For example, as described above, the media guidance application may determine that a subset of detailed information (e.g., actor names) is common to both the first (e.g., one of media asset identifiers 104, 108, and 110) and second media asset identifiers (e.g., one of media asset identifiers 116 and 120). However, some detailed information (e.g., a summary) may not be common to both. In this situation, the media guidance application retrieves the detailed information for the second media asset identifier not retrieved from the local storage device from the remote server. The media guidance application thus can generate a full set of detailed information for the second media asset identifier for display without having to retrieve all of the information (which may cause delays/increase network traffic) from the remote server.

In some embodiments, the media guidance application may determine that a first media asset identifier of the first plurality of media asset identifiers is related, but not identical, to a second media asset identifier of the second plurality of media asset identifiers. For example, the media guidance application may determine, as described above, that the first (e.g., one of media asset identifiers 104, 108, and 110) and second media asset identifiers (e.g., one of media asset identifiers 116 and 120) are not identical because of a difference in their characters. However, the media guidance application may determine that the two media asset identifiers are related or associated (e.g., based on a threshold number of characters matching, metadata corresponding, and/or a stored indication the two identifiers are related). For example, the first media asset identifier may be for "Star Wars: Episode II" and the second media asset identifier may be for "Star Wars: Episode III." While not identical, the media guidance application may determine that since the two media asset identifiers are related based on an indication that they are part of a series, some of the detailed information may be relevant. The media guidance application may then determine to retrieve a subset of the detailed information (e.g., detailed information 106) from the first media asset identifier to display with the second media asset identifier (e.g., detailed information 118) instead of transmitting a request to the remote server for the detailed information. As a specific example, the media guidance application may determine from a data structure that media asset identifiers that are part of a series often have the same actors, directors, and genres but not the same title or summary. Accordingly, the media guidance application may retrieve the actor, director and genre for "Star Wars: Episode II" and generate them for display with the identifier for "Star Wars: Episode III," thus saving a transaction with the remote server. In some embodiments, the media guidance application stores whether to request detailed information for related media assets as a user configurable option (e.g., via a button in a user interface) that can be toggled on or off.

The media guidance application may determine a second subset of media asset identifiers, the second subset including each media asset identifier of the second plurality of media asset identifiers where data in the first respective entry does not match data in the second respective entry. For example, the media guidance application may execute the program script described above for comparing media asset identifiers in the first (e.g., one of media asset identifiers 104, 108, and 110) and second (e.g., one of media asset identifiers 116 and 120) plurality of media asset identifiers and sort any media asset identifiers unique to the second plurality of media asset identifiers (e.g., media asset identifiers 120) into a list or other data structure (e.g., the second subset). For example, the media guidance application may, for each media asset identifier of the second plurality, retrieve data to compare from every media asset identifier of the first plurality. If none of the data compared (e.g., characters of the identifiers) match, then the media guidance application may execute an instruction to write an identifier of the media asset identifier for which none of the data matches to a list or other data structure defining the second subset (e.g., where detailed information has not already been retrieved from the remote server).

The media guidance application may then retrieve detailed information for each media asset identifier in the first subset of media asset identifiers from memory. For example, the media guidance application has already retrieved the detailed information for each media asset identifier in the first subset (e.g., containing media asset identifiers common to both first group of media asset identifiers 102 and second group of media asset identifiers 114) from the remote server (e.g., media guidance data source). The media guidance application may store the detailed information (e.g., detailed information 106) in volatile memory (e.g., DRAM or SRAM) due to not having enough non-volatile memory available to store the detailed information permanently. Since the detailed information has already been retrieved for each media asset in the second subset (e.g., since media asset identifier 104 corresponds to media asset identifier 116), the media guidance application retrieves the detailed information (e.g., detailed information 106) from the corresponding blocks of memory where it is stored instead of transmitting a request for the detailed information to the remote server, minimizing transactions with the remote server and also maximizing the speed at which the second group of media asset identifiers can be loaded.

The media guidance application may then retrieve detailed information for each media asset identifier in the second subset of media asset identifiers from a remote server. For example, for media asset identifiers where the detailed information has not been received previously (e.g., media asset identifiers 120), the media guidance application retrieves the detailed information from the remote server. For example, as described above for retrieving detailed information for the first plurality of media assets, the media guidance application transmits a data packet to a remote server containing each media asset identifier in the second subset. For example, the media guidance application may transmit the data packet including a single media asset identifier or a list or other suitable data structure of media asset identifiers. The media guidance application may then receive, from the remote server, the detailed information for each media asset identifier in the second subset.

In some embodiments, the media guidance application may determine that a third plurality of media asset identifiers are stored on the local storage device. For example, the media guidance application may have retrieved detailed information about a third group of media assets and may determine whether any detailed information retrieved for the third plurality of media asset identifiers overlaps with the second plurality of media asset identifiers (e.g., media asset identifiers 116 and 120). The media guidance application may then determine a third subset of media asset identifiers that are in both the second plurality of media asset identifiers and the third plurality of media asset identifiers. As described above when determining the first subset, the media guidance application may determine whether each media asset identifier of the second plurality of media asset identifiers matches one of the media asset identifiers of the third plurality and store an indication on a list or other data structure for each media asset identifier that matches. The media guidance application may then retrieve detailed information for each media asset identifier in the third subset of media asset identifiers from the local storage device. For example, as described above for the first subset, the media guidance application may retrieve detailed information from the local storage device since it has already been retrieved when the third plurality of media asset identifiers were previously displayed.

In some embodiments, the media guidance application retrieves a timestamp for detailed information for a first media asset identifier in the first subset stored on the local storage device. For example, the media guidance application may store a timestamp (e.g., the date and time) that detailed information (e.g., detailed information 106) for a media asset identifier (e.g., media asset identifier 104) was retrieved. The media guidance application may maintain a data structure with timestamps of when detailed descriptions were retrieved, or the timestamps may be stored with the detailed information (e.g., as a field in a table containing the detailed information). The media guidance application may determine, by subtracting the timestamp from the current time, whether the detailed information for the first media asset identifier exceeds a threshold amount of time stored. For example, the media guidance application may determine that the current time is 15:31 on May 31, 2016 (e.g., May 31, 2016) and the detailed information was retrieved at 10:31 on May 24, 2016. The media guidance application may determine the amount of time elapsed since retrieval of the detailed information by subtracting the individual values (e.g., 05 from 05, 24 from 31, etc.). As an example, the media guidance application may calculate that the time elapsed is five hours past one week (e.g., seven days and five hours). The media guidance application may then compare this value to a threshold value (e.g., five days) to determine whether the elapsed time exceeds the threshold time.

The media guidance application may then, in response to determining that the detailed information for the first media asset identifier exceeds the threshold amount of time stored, delete the detailed information for the first media asset identifier stored on the local storage device. For example, the media guidance application may delete the detailed information (e.g., detailed information 106) from the local storage device as opposed to retrieving it if the elapsed time is greater than the threshold time. The media guidance application may then retrieve new detailed information (e.g., to replace detailed information 106) for the first media asset identifier (e.g., media asset identifier 104) from the remote server. For example, as described above, the media guidance application may transmit a request for detailed information relating to the media asset identifier to a remote server. The media guidance application may then receive detailed information associated with the media asset identifier (e.g., in a data packet) from the remote server. The media guidance application may then store the new detailed information for the first media identifier on the local storage device.

In some embodiments, the media guidance application may generate for display a plurality of options for types of detailed information to retrieve. For example, the media guidance application may generate a user interface including a plurality of options to customize what types of information is retrieved from a remote server. For example, the options may be for types of detailed information (e.g., a subset of detailed information 106) such as an option to not retrieve detailed information of type "actor," "director," "summary" or any other subset of the detailed information. The media guidance application may then receive a user input of a first option to not retrieve a first type of detailed information if it is not stored in the local storage device. For example, the media guidance application may receive a user input (e.g., via a user input interface) of an option to not retrieve detailed information for type "actor." The media guidance application may, in response to receiving the user input, store an indication in the local storage device to only retrieve the first type of detailed information if it is stored in the local storage device. For example, the media guidance application may store (e.g., in a data structure) an indication that unless "actor" information is stored locally, it is not to be retrieved (e.g., not retrieved from a remote server). In this way, the media guidance application allows the user to customize the information that is retrieved and stored and more efficiently manage storage on a storage device with limited capacity.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
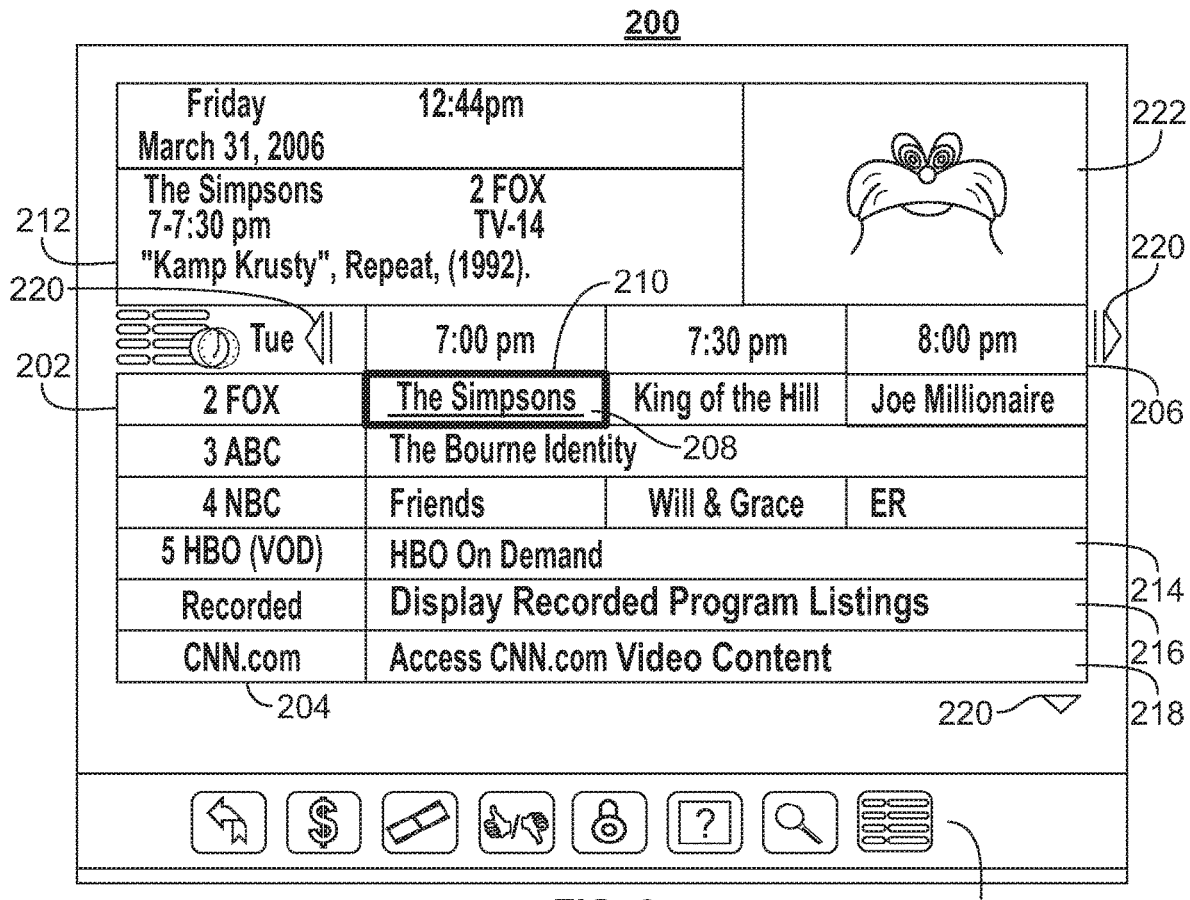
FIG. 2 shows another illustrative example of a display screen for use in accessing media content in accordance with some embodiments of the disclosure.
Figure 3:
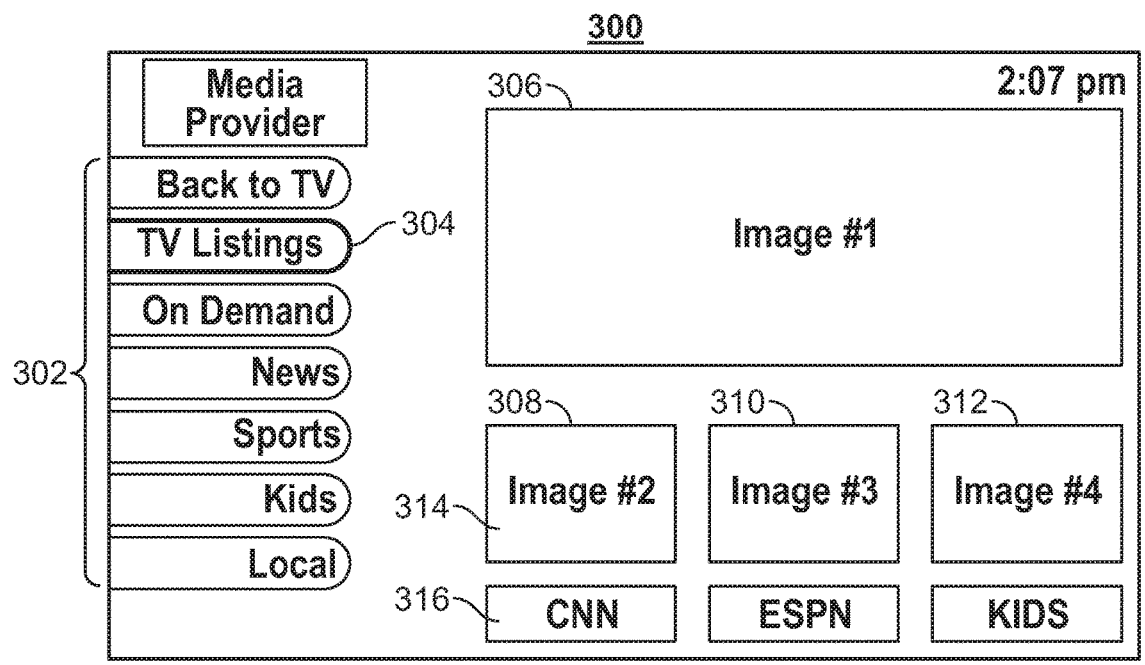
FIG. 3 shows yet another illustrative example of a display screen for use in accessing media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows an illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. patent application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
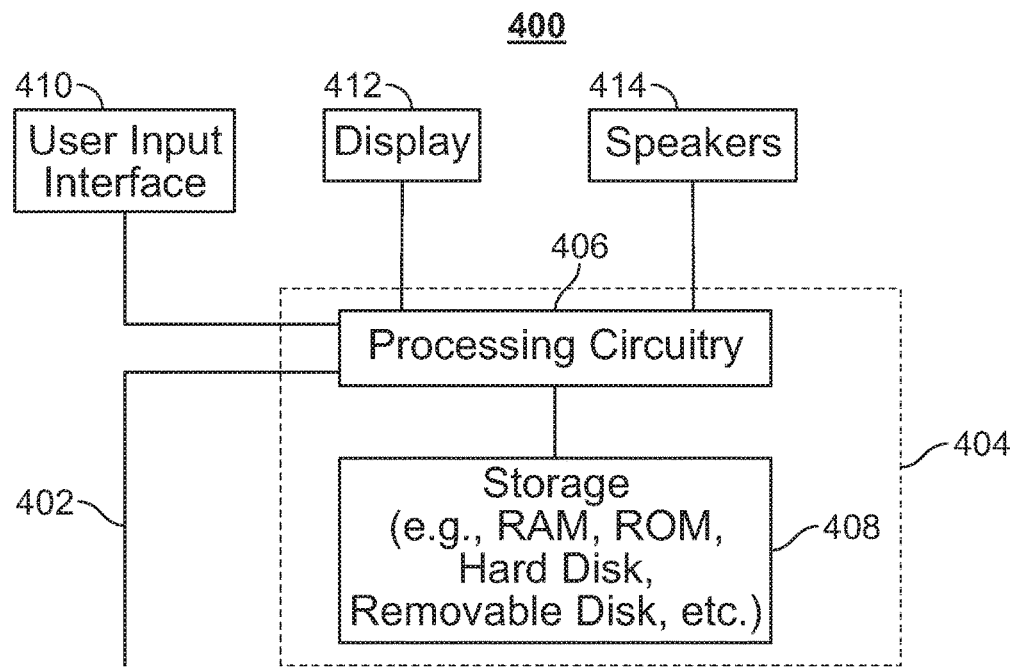
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
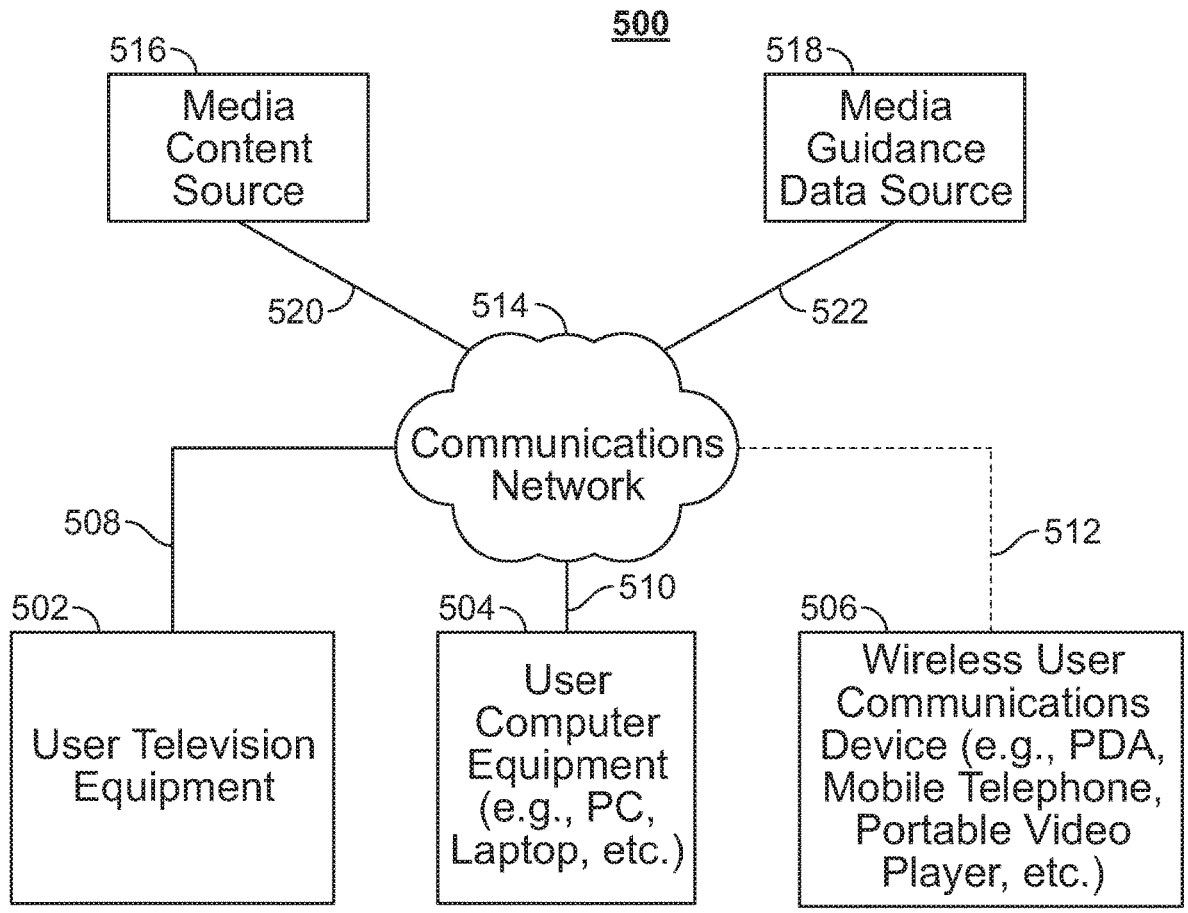
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a web site via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
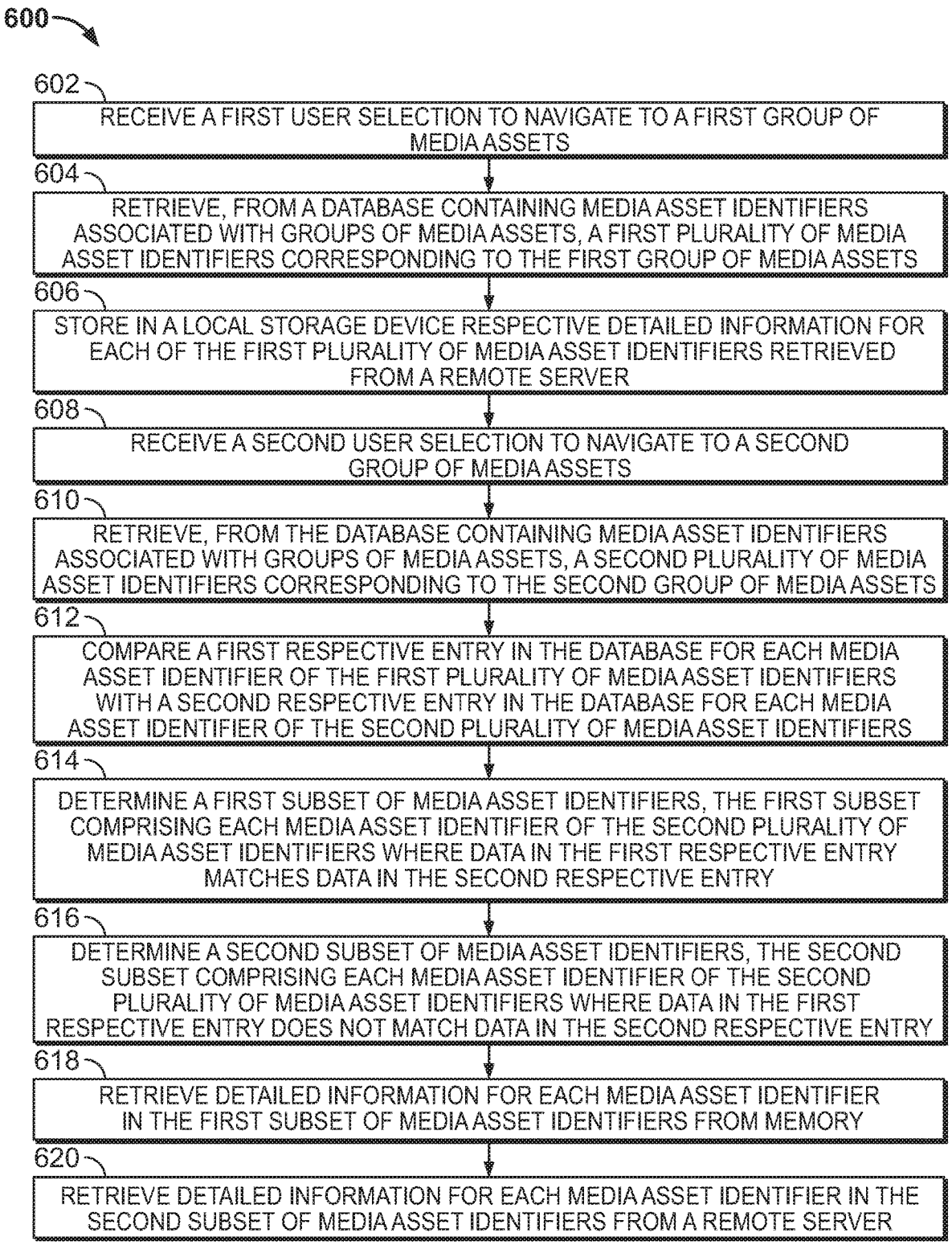
FIG. 6 is a flowchart of illustrative steps for reducing network traffic when retrieving media guidance data, in accordance with some embodiments of the disclosure.

FIG. 6 is a flowchart of illustrative steps for reducing network traffic when retrieving media guidance data, in accordance with some embodiments of the disclosure. For example, a media guidance application implementing process 600 may be executed by control circuitry 404 (FIG. 4). It should be noted that process 600 or any step thereof could be performed on, or provided by, any of the devices shown in FIGS. 4-5.

Process 600 begins at 602, where the media guidance application receives (e.g., via control circuitry 404) a first user selection to navigate to a first group of media assets comprising a first plurality of media asset identifiers. For example, the media guidance application may receive (e.g., via control circuitry 404) a user selection (e.g., via user input interface 410) to display (e.g., on display 412) a group of media asset identifiers. The group of media asset identifiers may be any set of related or unrelated media assets displayed to a user by the media guidance application. For example, the group of media asset identifiers may be a user defined list (e.g., a favorites list), a purchases list, a video-on-demand catalog, a grid-guide showing a plurality of media assets from a plurality of sources, and any other criteria for grouping a plurality of media assets by the media guidance application.

Process 600 continues to 604, where the media guidance application retrieves (e.g., via control circuitry 404), from a database containing media asset identifiers associated with groups of media assets, a first plurality of media asset identifiers corresponding to the first group of media assets. For example, as described further below with respect to FIG. 7, the media guidance application may access (e.g., via control circuitry 404) a media guidance database containing media asset identifiers associated with groups of media assets stored locally (e.g., in storage 408) or remotely (e.g., at media guidance data source 518 via communications network 514). The media guidance application may query the media guidance database for a specific set of media asset identifiers associated with the first group of media assets (e.g., a video-on-demand screen). For example, the media guidance application may execute (e.g., via control circuitry 404) a program script utilizing a database query language such as SQL to determine whether an entry for the group of media assets is present in the media guidance database and to retrieve pointers to media asset identifiers stored in fields associated with the entry. The media guidance application may then retrieve the identifiers from memory (e.g., from a remote server) based on the pointers.

Process 600 continues to 606, where the media guidance application stores (e.g., via control circuitry 404), in a local storage device, respective detailed information for each of the first plurality of media asset identifiers retrieved from a remote server. For example, the media guidance application may transmit (e.g., via control circuitry 404) a request or plurality of requests for detailed information for each of the media assets identifiers to the remote server (e.g., to media guidance data source 518 via communications network 514). As a specific example, the media guidance application may transmit (e.g., via control circuitry 404) a data packet to the remote server containing one or more identifiers and may receive the detailed information corresponding to the one or more identifiers. The media guidance application then stores (e.g., in storage 408) the retrieved detailed information. In some embodiments, the media guidance application stores the retrieved detailed information in non-volatile memory (e.g., flash memory) if it is available. In other embodiments, the media guidance application stores the retrieved detailed information in volatile memory (e.g., SRAM).

Process 600 continues to 608, where the media guidance application receives (e.g., via control circuitry 404) a second user selection to navigate to a second group of media assets. For example, the media guidance application may receive (e.g., via control circuitry 404) a user input (e.g., via user input interface 410) selecting a different group of media assets. For example, the media guidance application may first have received (e.g., via control circuitry 404) a request to view media assets identifiers in a video-on-demand guide and later receives a request to view media asset purchases. In some embodiments, the second plurality of media asset identifiers are stored in memory. For example, the media guidance application may be unable to store detailed information relating to media assets a user has purchased, but may be able to locally store (e.g., in storage 408) identifiers of media assets the user has purchased.

Process 600 continues to 610, where the media guidance application retrieves (e.g., via control circuitry 404), from the database containing media asset identifiers associated with groups of media assets, a second plurality of media asset identifiers corresponding to the second group of media assets. For example, as discussed above with respect to step 604, the media guidance application may similarly retrieve (e.g., via control circuitry 404) the second group of media asset identifiers. For example, the media guidance application may access (e.g., via control circuitry 404) the media guidance database containing media asset identifiers associated with groups of media assets stored locally (e.g., in storage 408) or remotely (e.g., at media guidance data source 518 via communications network 514). The media guidance application may query (e.g., via control circuitry 404) the media guidance database for a specific set of media asset identifiers associated with the second group of media assets (e.g., a purchases screen) and retrieve the identifiers.

Process 600 continues to 612, where the media guidance application compares (e.g., via control circuitry 404) a first respective entry in the database for each media asset identifier of the first plurality of media asset identifiers with a second respective entry in the database for each media asset identifier of the second plurality of media asset identifiers. For example, the media guidance application may execute (e.g., via control circuitry 404) a program script containing a for-loop to iteratively compare each media asset identifier in the first plurality of media asset identifiers and each media asset identifier in the second plurality of media asset identifiers. The media guidance application may retrieve (e.g., via control circuitry 404) data stored in entries associated with each media asset identifier of the first and second plurality of media asset identifiers to compare. For example, the media guidance application may retrieve from the database (e.g., stored locally in storage 408 or remotely at media guidance data source 518 accessible via communications network 514) characters of media asset identifiers and/or metadata associated with the media asset identifiers to compare.

Process 600 continues to 614, where the media guidance application determines (e.g., via control circuitry 404) a first subset of media asset identifiers, the first subset comprising each media asset identifier of the second plurality of media asset identifiers where data in the first respective entry matches data in the second respective entry. For example, the media guidance application may store (e.g., via control circuitry 404) an indication (e.g., on a list or other data structure in storage 408) containing an identifier (e.g., a string of alphanumeric characters) of each media asset identifier of the second plurality of media asset identifiers where a match between the first plurality of media asset identifiers and second plurality of media asset identifiers has been determined. Specifically, the media guidance application may determine (e.g., via control circuitry 404) a match based on comparing characters of two media asset identifiers (e.g., retrieved by the media guidance application from entries associated with the media asset identifiers in the database) and determining each character is identical and in the same order (e.g., based on indexing the characters). As described below with respect to FIG. 8, the media guidance application may determine a match even if each character is not identical. Upon determining a match, the media guidance application may execute (e.g., via control circuitry 404) an instruction to write an identifier of the matched media asset identifier to a list defining the first subset.

Process 600 continues to 616, where the media guidance application determines (e.g., via control circuitry 404) a second subset of media asset identifiers, the second subset comprising each media asset identifier of the second plurality of media asset identifiers where data in the first respective entry does not match data in the second respective entry. For example, the media guidance application may execute (e.g., via control circuitry 404) the program script described above with respect to step 612 for comparing media asset identifiers in the first and second plurality of media asset identifiers and sort (e.g., via control circuitry 404) any media asset identifiers unique to the second plurality of media asset identifiers into a list or other data structure (e.g., stored in storage 408). For example, the media guidance application may, for each media asset identifier of the second plurality, retrieve (e.g., via control circuitry 404) data to compare from every media asset identifier of the first plurality. If none of the data compared (e.g., characters of the identifiers) match, then the media guidance application may execute (e.g., via control circuitry 404) an instruction to write an identifier of the media asset identifier for which none of the data matches to a list or other data structure defining the second subset (e.g., where detailed information has not already been retrieved from the remote server).

Process 600 continues to 618, where the media guidance application retrieves (e.g., via control circuitry 404) detailed information for each media asset identifier in the first subset of media asset identifiers from memory. For example, the media guidance application has already retrieved (e.g., via control circuitry 404) the detailed information for each media asset identifier in the first subset from the remote server (e.g., media guidance data source 518 accessible via communications network 514). The media guidance application may store (e.g., via control circuitry) the detailed information in volatile memory (e.g., DRAM or SRAM) due to not having enough non-volatile memory available to store the detailed information permanently. Since the detailed information has already been retrieved (e.g., via control circuitry 404) for each media asset in the second subset, the media guidance application retrieves (e.g., via control circuitry 404) the detailed information from the corresponding blocks of memory (e.g., storage 408) where it is stored instead of transmitting a request for the detailed information to the remote server (e.g., media guidance data source 518 accessible via communications network 514), minimizing transactions with the remote server and also maximizing the speed at which the second group of media asset identifiers can be loaded.

Process 600 continues to 620, where the media guidance application retrieves (e.g., via control circuitry 404) detailed information for each media asset identifier in the second subset of media asset identifiers from a remote server. For example, for media asset identifiers where the detailed information has not been received previously (i.e., each media asset identifier in the second subset), the media guidance application retrieves (e.g., via control circuitry 404) the detailed information from the remote server (e.g., media guidance data source 518 accessible via communications network 514). For example, as described above for retrieving detailed information for the first plurality of media assets, the media guidance application transmits (e.g., via control circuitry) a data packet to a remote server containing each media asset identifier in the second subset. For example, the media guidance application may transmit (e.g., via control circuitry 404) the data packet including a single media asset identifier or a list or other suitable data structure of media asset identifiers. The media guidance application may then receive (e.g., via control circuitry 404), from the remote server, the detailed information for each media asset identifier in the second subset.

Figure 7:
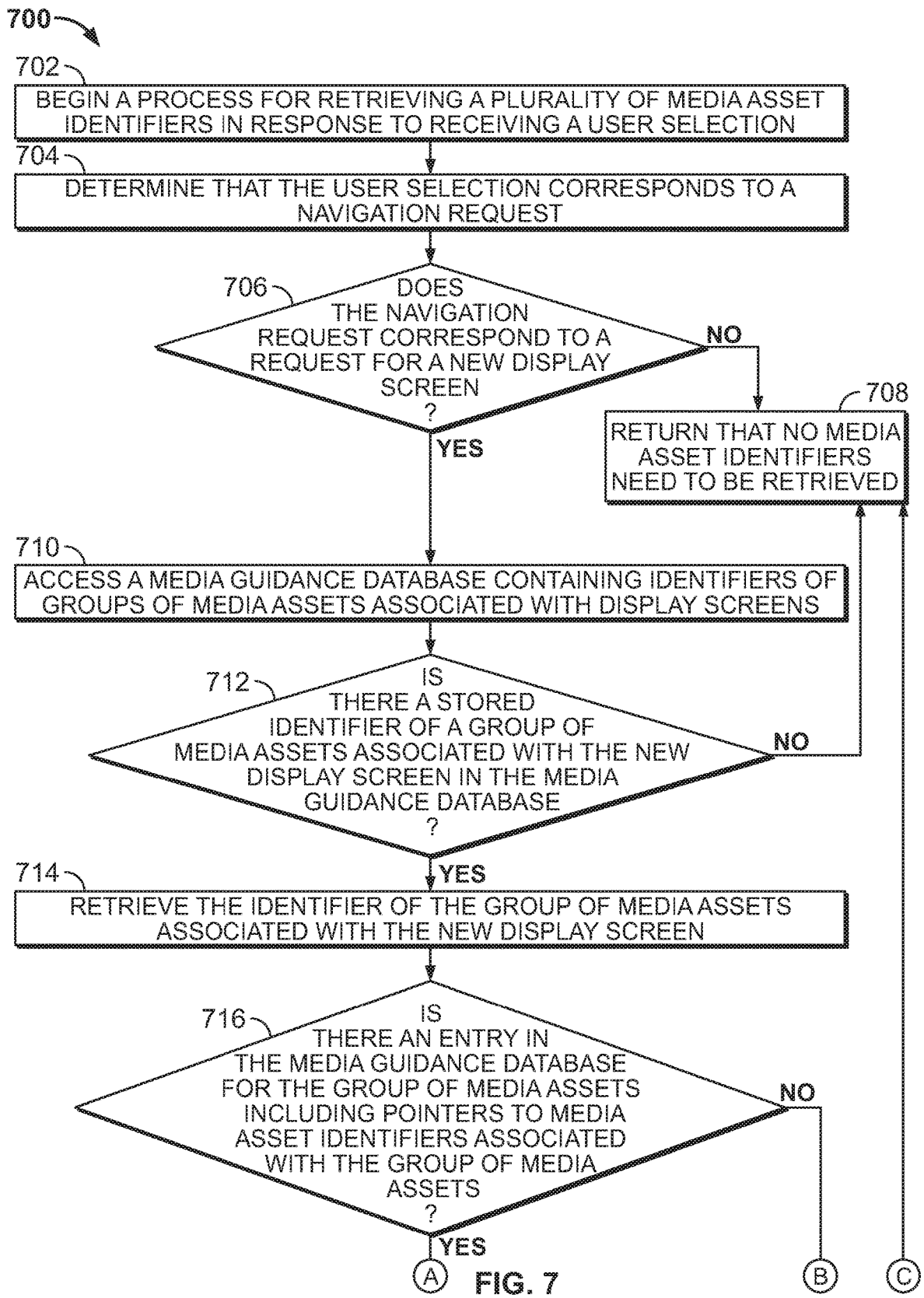
FIG. 7 is a flowchart of illustrative steps for retrieving media asset identifiers in response to a user selection, in accordance with some embodiments of the disclosure.
Figure 7:
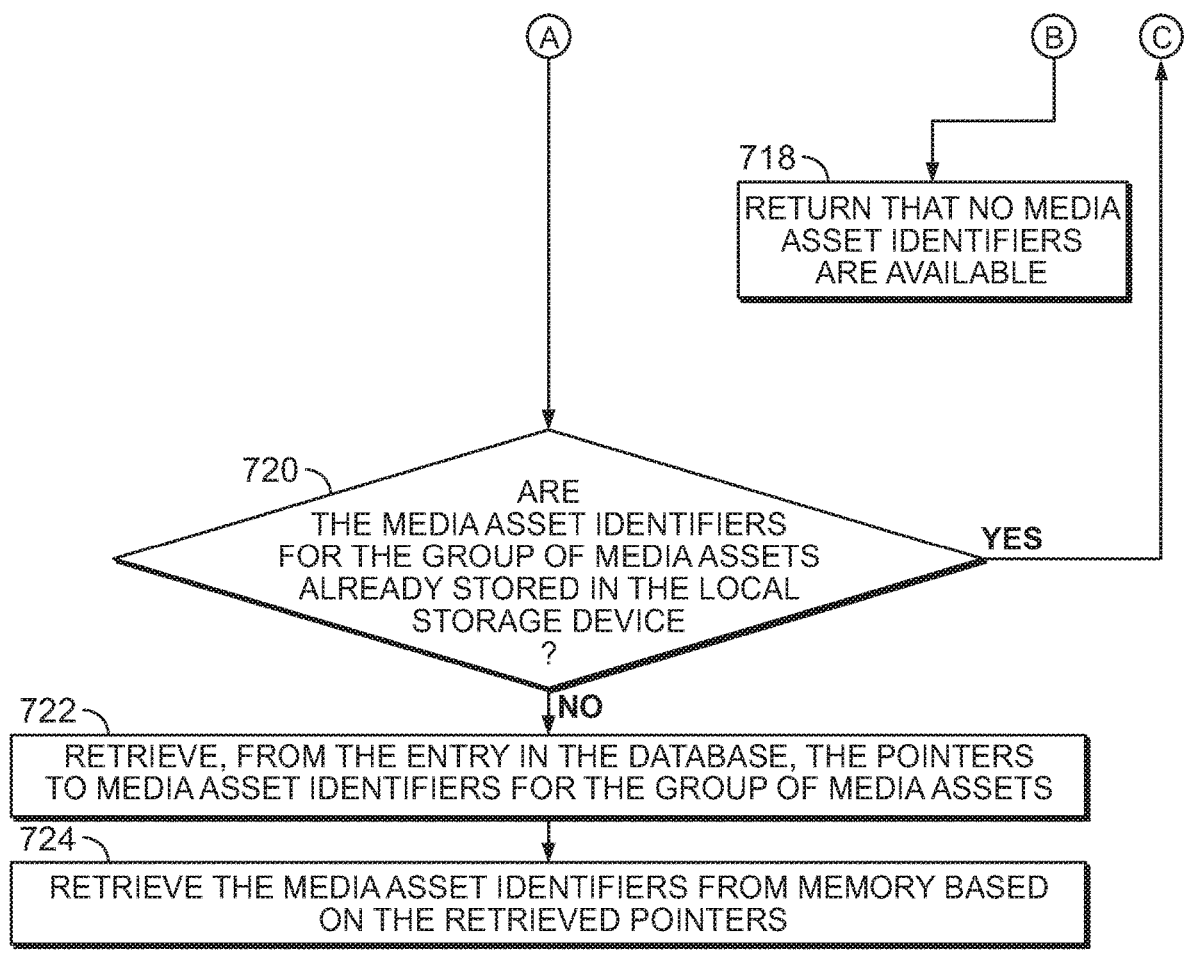

FIG. 7 is a flowchart of illustrative steps for retrieving media asset identifiers in response to a user selection, in accordance with some embodiments of the disclosure. For example, a media guidance application implementing process 700 may be executed by control circuitry 404 (FIG. 4). It should be noted that process 700 or any step thereof could be performed on, or provided by, any of the devices shown in FIGS. 4-5. Process 700 starts at 702, where the media guidance application begins (e.g., via control circuitry 404) a process for retrieving a plurality of media asset identifiers in response to receiving a user selection. For example, the media guidance application may initialize the necessary variables and execute (e.g., via control circuitry 404) a program script calling a particular method to execute process 700.

Process 700 continues to 704, where the media guidance application determines (e.g., via control circuitry 404) that the user selection corresponds to a navigation request. For example, the media guidance application may maintain a table (e.g., stored in storage 408) of user inputs mapped to appropriate actions (e.g., executable instructions). Based on comparing (e.g., via control circuitry 404) the received user selection (e.g., via user input interface 410) with the table, the media guidance application may determine (e.g., via control circuitry 404) that the received user selection corresponds to a navigation command (e.g., any command to navigate to a different media asset identifier or set of identifiers). For example, the media guidance application may receive (e.g., via control circuitry 404) a user selection of an "UP" command using a remote control. Based on comparing an identifier of the command (e.g., "UP") with the table, the media guidance application may determine that the received user selection corresponds to a navigation request.

Process 700 continues to 706, where the media guidance application determines (e.g., via control circuitry 404) whether the navigation request corresponds to a request for a new display screen. For example, the media guidance application may currently be generating for display (e.g., on display 412) ten media asset identifiers. If the user has navigated to the first media asset identifier and the media guidance application receives (e.g., via control circuitry 404) a user input of the "UP" command (e.g., via user input interface 410), then the media guidance application may determine (e.g., via control circuitry 404) that the request corresponds to a request for a media asset identifier that is outside the bounds of the current display screen. For example, the media guidance application may access (e.g., via control circuitry 404) a data structure (e.g., stored locally in storage 408 or remotely at media guidance data source 518) defining commands that, when received while a particular media asset identifier is selected, correspond to a request for a new display screen. The data structure may be stored with data defining the structure of media asset identifiers (e.g., their order when presented to a user) and may be arranged as a table where each entry is for a media asset identifier and contains field(s) defining commands that may be received that result in a need for the media guidance application to retrieve another display screen. As a specific example, an entry for the first media asset identifier may contain a field that identifies the "UP" command as a command that results in a request for a new display screen. As another example, a "VOD" command may correspond to a request to access a new display screen with video-on-demand media asset identifiers.

If at step 706 the media guidance application determines the navigation request does not correspond to a request for a new display screen, process 700 continues to 708, where the media guidance application returns (e.g., via control circuitry 404) that no media asset identifiers need to be retrieved. For example, if the media guidance application determines (e.g., based on comparison with a table defining the order of media asset identifiers presented to a user as described above with respect to step 706) that the navigation command does not require a new display screen to be generated, then no media asset identifiers need to be retrieved since they are already generated for display (e.g., on display 412). After returning an indication that no media asset identifiers need to be retrieved, process 700 may terminate.

If at step 706 the media guidance application determines the navigation request does correspond to a request for a new display screen, process 700 continues to 710, where the media guidance application accesses (e.g., via control circuitry 404) a media guidance database containing identifiers of groups of media assets associated with display screens. For example, the media guidance application may access the database containing identifiers of groups of media assets associated with display screens locally (e.g., in storage 408) or remotely (at media guidance data source 518 accessible via communications network 514). The database may be stored and/or integrated with the data structure described with respect to step 706.

Process 700 continues to 712, where the media guidance application determines (e.g., via control circuitry 404) whether there is a stored identifier of a group of media assets associated with the new display screen in the media guidance database. For example, the media guidance application may execute (e.g., via control circuitry 404) a database query language script, such as SQL, to determine whether there is a non-null entry for an identifier of a group of media assets associated (e.g., in a field) with the new display screen. For example, the data structure (e.g., as described with respect to step 706) may contain a pointer to an entry in the database that contains an identifier of a group of media asset identifiers corresponding to the received user selection. As a specific example, a received user selection of a "VOD" button on a remote control may cause the media guidance application to access (e.g., via control circuitry 404) an entry in the data structure for the "VOD" command and retrieve a pointer to an entry in the database containing identifiers of groups of media assets associated with display screens.

If at step 712 the media guidance application determines there is not a stored identifier of a group of media assets associated with the new display screen, process 700 continues to 708, where the media guidance application returns (e.g., via control circuitry 404) that no media asset identifiers need to be retrieved. For example, the media guidance application may determine (e.g., via control circuitry 404) that since no identifier of a group of media asset identifiers is stored in the database, there are no media asset identifiers that need to be retrieved. For example, a command for a new display screen need not necessarily result in media asset identifiers being displayed and could be a request to play a preview of a media asset, display news stories, etc. In these situations, the media guidance application would determine (e.g., via control circuitry 404) that no media asset identifiers need to be retrieved (e.g., since no identifier of an associated group of media assets is stored).

If at step 712 the media guidance application determines there is a stored identifier of a group of media assets associated with the new display screen, process 700 continues to 714, where the media guidance application retrieves (e.g., via control circuitry 404) the identifier of the group of media assets associated with the new display screen. For example, the media guidance application may execute (e.g., via control circuitry 404) an SQL script utilizing the "Select" command to access and retrieve the identifier of the group of media assets (e.g., "VOD_001").

Process 700 continues to 716, where the media guidance application determines (e.g., via control circuitry 404) if there is an entry in the media guidance database for the group of media assets including pointers to media asset identifiers associated with the group of media assets. For example, the media guidance application may store (e.g., locally in storage 408 or remotely in media guidance data source 518) a pointer to a location in memory containing media asset identifiers associated with the new display screen. The pointer may be the identifier of the group of media assets, or may be stored in an associated field in the database. Alternatively, the media guidance application may search the database for an entry including the identifier (e.g., "VOD_001") of the group of media assets. The media guidance application may then access (e.g., via control circuitry 404) the entry and media asset identifiers associated with the group of media assets and/or pointers to media asset identifiers associated with the group of media assets. The media guidance application may determine (e.g., via control circuitry 404) that the entry in the database corresponding to the pointer is null. In this instance, process 700 proceeds to 718, where the media guidance application returns (e.g., via control circuitry 404) that no media asset identifiers are available. For example, the media guidance application may optionally transmit (e.g., via control circuitry 404) an error message to the user and/or service provider as the presence of the pointer indicates that media asset identifiers should be available and likely were moved to a different location in memory.

If at step 716 the media guidance application determines there is an entry for the group of media assets including pointers to media asset identifiers associated with the group of media assets, process 700 continues to 720, where the media guidance application determines (e.g., via control circuitry 404) whether the media asset identifiers are already stored in the local storage device. For example, as discussed above with respect to FIGS. 1 and 6, the media guidance application may store the identifiers of media assets locally (e.g., for media assets a user has purchased) but not the associated detailed information. To determine whether this is the case (and thus whether both media asset identifiers and detailed information need to be retrieved) the media guidance application determines (e.g., via control circuitry 404) whether media asset identifiers associated with the group of media assets are stored locally (e.g., in storage 408). For example, the media guidance application may check to see for each locally stored media asset identifier whether the identifier of the group of media assets (e.g., "VOD_001") is stored in an associated field. The media guidance application may, alternatively or additionally, maintain a log of identifiers of groups of media assets where the media asset identifiers have already been retrieved and compare (e.g., via control circuitry 404) with the log (e.g., a list stored in memory) to determine whether the media asset identifiers are already stored locally.

If at step 720 the media guidance application determines the media asset identifiers for the group of media assets are already stored in the local storage device, process 700 continues to 708, where the media guidance application returns (e.g., via control circuitry 404) that no media asset identifiers need to be retrieved. For example, because the media asset identifiers that need to be generated for display with the new display screen are already stored locally (e.g., in storage 408), the media guidance application may terminate process 700.

If at step 720 the media guidance application determines the media asset identifiers for the group of media assets are not already stored in the local storage device, process 700 continues to 722, where the media guidance application retrieves (e.g., via control circuitry 404) from the entry in the database, the pointers to media asset identifiers for the group of media assets. For example, the media guidance application may execute (e.g., via control circuitry 404) an SQL script to retrieve the contents of the entry in the database (e.g., to retrieve the pointer(s) to locations in memory storing the media asset identifiers associated with the group of media assets). Process 700 continues to 724, where the media guidance application retrieves (e.g., via control circuitry 404) the media asset identifiers from memory based on the retrieved pointers. For example, the media guidance application may retrieve (e.g., via control circuitry 404) and store (e.g., in storage 408) the media asset identifiers that are to be displayed as a result of the user selection (e.g., the navigation request).

Figure 8:
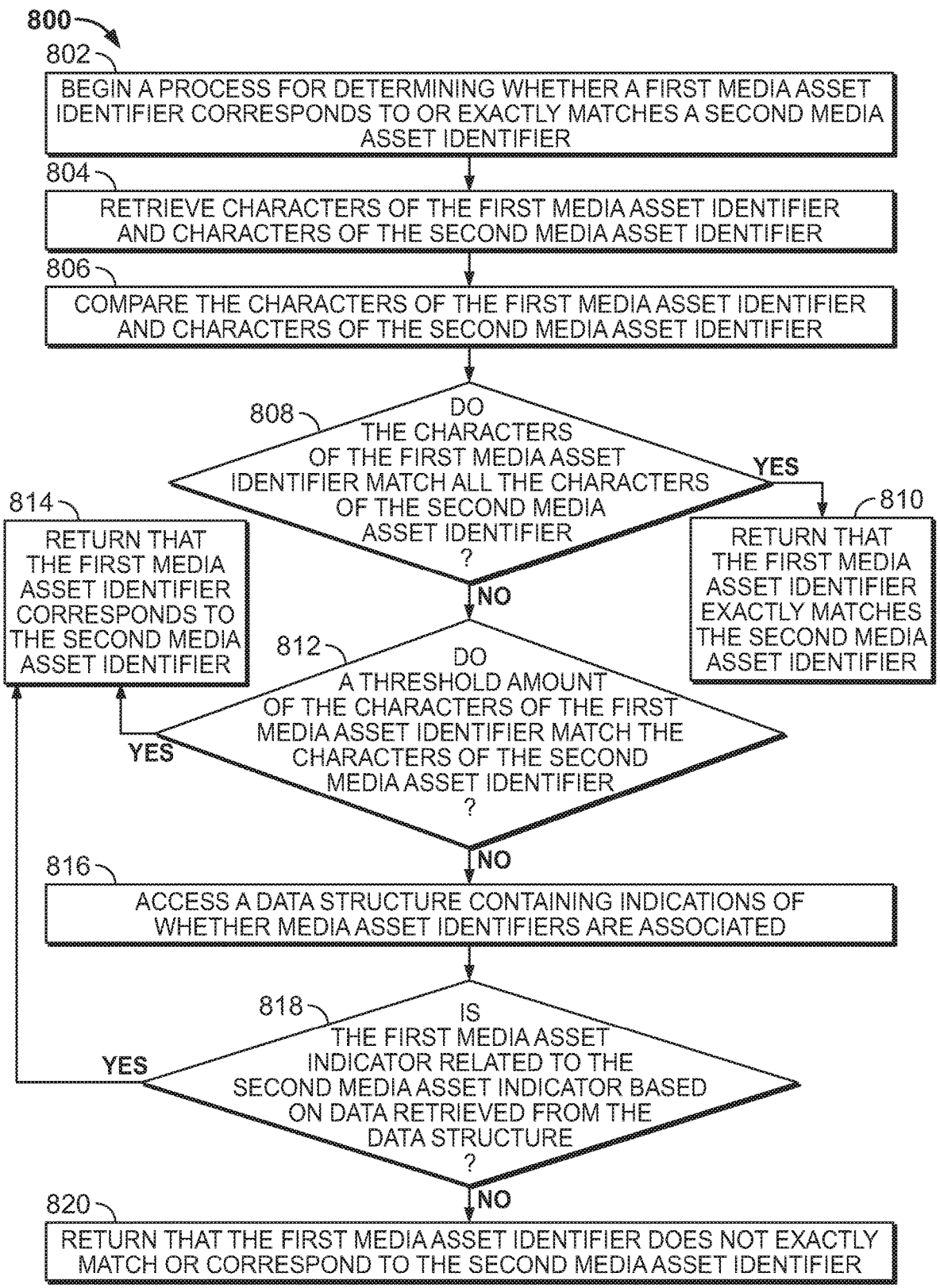
FIG. 8 is a flowchart of illustrative steps for determining whether a first media asset identifier corresponds to or exactly matches a second media asset identifier, in accordance with some embodiments of the disclosure.

FIG. 8 is a flowchart of illustrative steps for determining whether a first media asset identifier corresponds to or exactly matches a second media asset identifier, in accordance with some embodiments of the disclosure. For example, a media guidance application implementing process 800 may be executed by control circuitry 404 (FIG. 4). It should be noted that process 700 or any step thereof could be performed on, or provided by, any of the devices shown in FIGS. 4-5. Process 800 starts at 802, where the media guidance application begins (e.g., via control circuitry 404) a process for determining whether a first media asset identifier corresponds to or exactly matches a second media asset identifier. For example, the media guidance application may initialize the necessary variables and execute (e.g., via control circuitry 404) a program script calling a particular method to execute process 800.

Process 800 continues to 804, where the media guidance application retrieves (e.g., via control circuitry 404) characters of the first media asset identifier and characters of the second media asset identifier. For example, the media guidance application may retrieve (e.g., via control circuitry 404 executing an SQL program script utilizing the "Select" command) a string of characters (e.g., "James Bond: Goldfinger") associated with a first media asset identifier of the first plurality of media asset identifiers (e.g., video-on-demand listings) and a string of characters (e.g., "James Bond: Casino Royale") associated with a second media asset identifier of the second plurality of media asset identifiers (e.g., recent purchases).

Process 800 continues to 806, where the media guidance application compares (e.g., via control circuitry 404) the characters of the first media asset identifier and the characters of the second media asset identifier. For example, the media guidance application may compare (e.g., via control circuitry 404) indexed characters of the retrieved strings to determine whether each character matches.

Process 800 continues to 808, where the media guidance application determines (e.g., via control circuitry 404) whether the characters of the first media asset identifier match all the characters of the second media asset identifier. For example, the media guidance application may determine (e.g., via control circuitry 404) that the first ten characters (e.g., "James Bond:") match, but the subsequent characters do not (e.g., no indexed character of "Goldfinger" matches the corresponding indexed character of "Casino Royale").

If the media guidance application determines that all the characters of the first and second media asset identifiers match, process 800 continues to 808, where the media guidance application returns (e.g., via control circuitry 404) that the first media asset identifier exactly matches the second media asset identifier. For example, the media guidance application may determine that "James Bond: Goldfinger" is an exact match with a second media asset identifier "James Bond: Goldfinger." Based on the identified match, the media guidance application may retrieve detailed information for the first media asset identifier already stored in storage (e.g., storage 408) and generate it for display with the second media asset identifier, as described above with respect to FIGS. 1 and 6.

If the media guidance application determines that all the characters of the first and second media asset identifiers do not match, process 800 continues to 810, where the media guidance application determines (e.g., via control circuitry 404) if a threshold amount of characters of the first media asset identifier match the characters of the second media asset identifier. For example, the media guidance application may determine (e.g., via control circuitry 404) a number or percentage (e.g., 80%) of characters that match between the characters of the first media asset identifier and the characters of the second media asset identifier. The media guidance application may then compare (e.g., via control circuitry 404) this to a threshold number or percentage of matched characters (e.g., 70%) and determine whether the amount or percentage of characters matched between the first media asset identifier and the second media asset identifier exceeds the threshold.

If the media guidance application determines that a threshold amount of the characters of the first and second media asset identifiers match, process 800 continues to 812, where the media guidance application returns (e.g., via control circuitry 404) that the first media asset identifier corresponds to the second media asset identifier. For example, the media guidance application may determine (e.g., via control circuitry 404) that since the media asset identifiers do not exactly match, but correspond, a subset of the detailed information between the two media asset identifiers corresponds and can be retrieved from local storage. The media guidance application may then determine (e.g., via control circuitry 404) that some detailed information should be retrieved from a remote server (e.g., if the media asset identifiers are different episodes of a series, the director and actors may be the same but the summary may be different).

If the media guidance application determines that a threshold amount of the characters of the first and second media asset identifiers do not match, process 800 continues to 814, where the media guidance application accesses (e.g., via control circuitry 404) a data structure containing indications of whether media asset identifiers are associated. For example, the media guidance application may access (e.g., via control circuitry 404) a data structure (e.g., stored either locally in storage 408 or remote at media guidance data source 518) containing equivalent identifiers which may be organized as a table where each entry (e.g., row) contains identifiers that are associated with the same media asset. The media guidance application may then retrieve (e.g., via control circuitry 404) an entry in the data structure for the first media asset identifier. For example, the media guidance application may execute (e.g., via control circuitry 404) an instruction (e.g., an SQL program script utilizing the "Select" command) to retrieve, from an entry for a first media asset identifier, all other associated media asset identifiers (e.g., from fields associated with the entry).

Process 800 continues to 816, where the media guidance application determines (e.g., via control circuitry 404) whether the first media asset indicator is related to the second media asset indicator based on data retrieved from the data structure. For example, the media guidance application may retrieve (e.g., via control circuitry 404), from fields associated with an entry for the media asset identifier (e.g., "Star Wars: Episode I") media asset identifiers (e.g., "Star Wars: First Episode," and "Star Wars: Ep. 1") indicated as equivalent media asset identifiers. Based on comparing (e.g., via control circuitry 404 performing character comparison as described above with respect to step 806) the second media asset identifier to the retrieved equivalent identifiers, the media guidance application can determine (e.g., via control circuitry 404) whether they are related.

If the media guidance application determines that the first media asset indicator is related to the second media asset indicator based on data retrieved from the data structure, process 800 continues to 812, where the media guidance application returns (e.g., via control circuitry 404) that the first media asset identifier corresponds to the second media asset identifier. For example, as described above, the media guidance application may determine (e.g., via control circuitry 404) that since the media asset identifiers do not exactly match, but correspond, a subset of the detailed information between the two media asset identifiers corresponds and can be retrieved from local storage (e.g., storage 408).

If the media guidance application determines that the first media asset indicator is not related to the second media asset indicator based on data retrieved from the data structure, process 800 continues to 812, where the media guidance application returns (e.g., via control circuitry 404) that the first media asset identifier does not exactly match or correspond to the second media asset identifier. For example, the media guidance application may execute (e.g., via control circuitry 404) an instruction to write an identifier of the media asset identifier for which none of the data matches to a list or other data structure defining the second subset (e.g., where detailed information has not already been retrieved from the remote server), as described above with respect to FIGS. 1 and 6.

It is contemplated that the steps or descriptions of FIGS. 6-8 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-5 could be used to perform one or more of the steps in FIGS. 6-8.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for reducing network traffic when retrieving media guidance data, the method comprising:
   receiving a first user selection to navigate to a first group of media assets;

in response to receiving the first user selection:
  retrieving, from a database containing media asset identifiers associated with groups of media assets, a first plurality of media asset identifiers corresponding to the first group of media assets;
  storing in a local storage device respective detailed information retrieved from a remote server for each of the first plurality of media asset identifiers;
receiving a second user selection to navigate to a second group of media assets; and
in response to receiving the second user selection:
  retrieving, from the database containing media asset identifiers associated with groups of media assets, a second plurality of media asset identifiers corresponding to the second group of media assets;
  determining, by comparing a first respective entry in the database for each media asset identifier of the first plurality of media asset identifiers with a second respective entry in the database for each media asset identifier of the second plurality of media asset identifiers:
    a first subset of media asset identifiers, the first subset comprising each media asset identifier of the second plurality of media asset identifiers where data in the first respective entry matches data in the second respective entry; and
    a second subset of media asset identifiers, the second subset comprising each media asset identifier of the second plurality of media asset identifiers where data in the first respective entry does not match data in the second respective entry;
  retrieving detailed information for each media asset identifier in the first subset of media asset identifiers from the local storage device;
  in response to retrieving the detailed information for each media asset identifier in the first subset of media asset identifiers, displaying the retrieved detailed information for each media asset identifier in the first subset of media asset identifiers and an indicator for each media asset identifier in the second subset of media asset identifiers, the indicator for each media asset identifier in the second subset of media asset identifiers indicating that detailed information is being retrieved for the corresponding media asset identifier in the second subset of media asset identifiers;
  retrieving detailed information for each media asset identifier in the second subset of media asset identifiers from the remote server; and
  in response to retrieving the detailed information for each media asset identifier in the second subset of media asset identifiers, updating the display of the retrieved detailed information for each media asset identifier in the first subset of media asset to also display the retrieved detailed information for each media asset identifier in the second subset of media asset identifiers by replacing the indicator for each media asset identifier in the second subset of media asset identifiers with the retrieved detailed information for each media asset identifier in the second subset of media asset identifiers, wherein the detailed information for each media asset identifier in the first subset of media asset identifiers is displayed before the detailed information for each media asset identifier in the second subset of media asset identifiers is retrieved from the remote server, wherein determining the first subset of media asset identifiers comprises:
  retrieving, from the database, characters of a first media asset identifier of the first plurality of media asset identifiers in a first entry and characters of a second media asset identifier of the second plurality of media asset identifiers in a second entry;
  comparing the characters of the first media asset identifier with the characters of the second media asset identifier;
  determining whether the characters of the first media asset identifier match the characters of the second media asset identifier; and
  in response to determining the characters of the first media asset identifier match the characters of the second media asset identifier, determining the first media asset identifier corresponds to the second media asset identifier, and
wherein the method further comprises:
  in response to determining that the characters of the first media asset identifier do not match the characters of the second media asset identifier:
    accessing a data structure containing first equivalent identifiers associated with the first media asset identifier and second equivalent identifies associated with the second media asset identifier;
    retrieving an entry in the data structure for the first media asset identifier;
    determining, based on data in the entry identifying the second media asset identifier, that the second media asset identifier is associated with the first media asset identifier;
    in response to determining the first media asset identifier is associated with the second media asset identifier, determining a subset of the detailed information for the second media asset identifier that matches the first media asset identifier; and
    retrieving the subset of the detailed information for the second media asset identifier from the local storage device.

2. The method of claim 1, wherein retrieving the detailed information for each media asset identifier in the second subset of media asset identifiers comprises:
  transmitting a data packet to the remote server containing each media asset identifier in the second subset; and
  receiving, from the remote server, the detailed information for each media asset identifier in the second subset.

3. The method of claim 1, wherein the second plurality of media asset identifiers are stored in the local storage device.

4. The method of claim 1, further comprising:
  determining the detailed information for the second media asset identifier not retrieved from the local storage device; and
  retrieving the detailed information for the second media asset identifier not retrieved from the local storage device from the remote server.

5. The method of claim 1, further comprising:
  retrieving a timestamp for detailed information for a first media asset identifier in the first subset stored on the local storage device;
  determining, by subtracting the timestamp from the current time, whether the detailed information for the first media asset identifier exceeds a threshold amount of time stored;
  in response to determining that the detailed information for the first media asset identifier exceeds the threshold amount of time stored, deleting the detailed information for the first media asset identifier stored on the local storage device;
retrieving new detailed information for the first media asset identifier from the remote server; and
storing the new detailed information for the first media identifier on the local storage device.

6. The method of claim 1, further comprising:
generating for display a plurality of options for types of detailed information to retrieve;
receiving a user input of a first option to not retrieve a first type of detailed information if it is not stored in the local storage device; and
in response to receiving the user input, storing an indication in the local storage device to only retrieve the first type of detailed information if it is stored in the local storage device.

7. The method of claim 1, further comprising:
determining that a third plurality of media asset identifiers are stored on the local storage device;
determining a third subset of media asset identifiers that are in both the second plurality of media asset identifiers and the third plurality of media asset identifiers; and
retrieving detailed information for each media asset identifier in the third subset of media asset identifiers from the local storage device.

8. A system for reducing network traffic when retrieving media guidance data, the system comprising:
storage circuitry configured to:
store in a local storage device respective detailed information retrieved from a remote server for each of a first plurality of media asset identifiers; and
control circuitry configured to:
receive a first user selection to navigate to a first group of media assets;
in response to receiving the first user selection, retrieve, from a database containing media asset identifiers associated with groups of media assets, the first plurality of media asset identifiers corresponding to the first group of media assets;
receive a second user selection to navigate to a second group of media assets; and
in response to receiving the second user selection:
retrieve, from the database containing media asset identifiers associated with groups of media assets, a second plurality of media asset identifiers corresponding to the second group of media assets
determine, by comparing a first respective entry in the database for each media asset identifier of the first plurality of media asset identifiers with a second respective entry in the database for each media asset identifier of the second plurality of media asset identifiers:
a first subset of media asset identifiers, the first subset comprising each media asset identifier of the second plurality of media asset identifiers where data in the first respective entry matches data in the second respective entry; and
a second subset of media asset identifiers, the second subset comprising each media asset identifier of the second plurality of media asset identifiers where data in the first respective entry does not match data in the second respective entry;
retrieve detailed information for each media asset identifier in the first subset of media asset identifiers from the local storage device;
in response to retrieving the detailed information for each media asset identifier in the first subset of media asset identifiers, display the retrieved detailed information for each media asset identifier in the first subset of media asset identifiers and an indicator for each media asset identifier in the second subset of media asset identifiers, the indicator for each media asset identifier in the second subset of media asset identifiers indicating that detailed information is being retrieved for the corresponding media asset identifier in the second subset of media asset identifiers;
retrieve detailed information for each media asset identifier in the second subset of media asset identifiers from the remote server; and
in response to retrieving the detailed information for each media asset identifier in the second subset of media asset identifiers, update the display of the retrieved detailed information for each media asset identifier in the first subset of media asset to also display the retrieved detailed information for each media asset identifier in the second subset of media asset identifiers by replacing the indicator for each media asset identifier in the second subset of media asset identifiers with the retrieved detailed information for each media asset identifier in the second subset of media asset identifiers, wherein the detailed information for each media asset identifier in the first subset of media asset identifiers is displayed before the detailed information for each media asset identifier in the second subset of media asset identifiers is retrieved from the remote server,
wherein the control circuitry is further configured, when determining the first subset of media asset identifiers, to:
retrieve, from the database, characters of a first media asset identifier of the first plurality of media asset identifiers in a first entry and characters of a second media asset identifier of the second plurality of media asset identifiers in a second entry;
compare the characters of the first media asset identifier with the characters of the second media asset identifier;
determine whether the characters of the first media asset identifier match the characters of the second media asset identifier; and
in response to determining the characters of the first media asset identifier match the characters of the second media asset identifier, determine the first media asset identifier corresponds to the second media asset identifier, and
wherein the control circuitry is further configured to:
in response to determining that the characters of the first media asset identifier do not match the characters of the second media asset identifier:
access a data structure containing first equivalent identifiers associated with the first media asset identifier and second equivalent identifies associated with the second media asset identifier;
retrieve an entry in the data structure for the first media asset identifier;

determine, based on data in the entry identifying the second media asset identifier, that the second media asset identifier is associated with the first media asset identifier;

in response to determining the first media asset identifier is associated with the second media asset identifier, determine a subset of the detailed information for the second media asset identifier that matches the first media asset identifier; and retrieve the subset of the detailed information for the second media asset identifier from the local storage device.

9. The system of claim 8, wherein the control circuitry is further configured, when retrieving the detailed information for each media asset identifier in the second subset of media asset identifiers, to:

transmit a data packet to the remote server containing each media asset identifier in the second subset; and receive, from the remote server, the detailed information for each media asset identifier in the second subset.

10. The system of claim 8, wherein the second plurality of media asset identifiers are stored in the local storage device.

11. The system of claim 8, wherein the control circuitry is further configured to:

determine the detailed information for the second media asset identifier not retrieved from the local storage device; and retrieve the detailed information for the second media asset identifier not retrieved from the local storage device from the remote server.

12. The system of claim 8, wherein the control circuitry is further configured to:

retrieve a timestamp for detailed information for a first media asset identifier in the first subset stored on the local storage device;

determine, by subtracting the timestamp from the current time, whether the detailed information for the first media asset identifier exceeds a threshold amount of time stored;

in response to determining that the detailed information for the first media asset identifier exceeds the threshold amount of time stored, delete the detailed information for the first media asset identifier stored on the local storage device;

retrieve new detailed information for the first media asset identifier from the remote server; and store the new detailed information for the first media identifier on the local storage device.

13. The system of claim 8, wherein the control circuitry is further configured to:

generate for display a plurality of options for types of detailed information to retrieve;

receive a user input of a first option to not retrieve a first type of detailed information if it is not stored in the local storage device; and in response to receiving the user input, store an indication in the local storage device to only retrieve the first type of detailed information if it is stored in the local storage device.

14. The system of claim 8, wherein the control circuitry is further configured to:

determine that a third plurality of media asset identifiers are stored on the local storage device;

determine a third subset of media asset identifiers that are in both the second plurality of media asset identifiers and the third plurality of media asset identifiers; and retrieve detailed information for each media asset identifier in the third subset of media asset identifiers from the local storage device.

* * * * *